INVENTOR.
DAVEY L. MALABY
BY Donald F Voss
ATTORNEY

Aug. 19, 1969 D. L. MALABY 3,462,737

CHARACTER SIZE MEASURING AND NORMALIZING FOR CHARACTER RECOGNITION SYSTEMS

Filed Dec. 18, 1964 16 Sheets-Sheet 2

| SHIFT REGISTER 100 | | COND 1 | COND 2 | COND 3 | COND 4 | COND 5 | ABORT | ABORT | |
|---|---|---|---|---|---|---|---|---|---|
| | 6 | X | X | X | X | X | 1 | 1 | |
| | 5 | O | X | X | O | X | 1 | X | |
| | 4 | O | X | X | O | X | X | 1 | |
| | 3 | O | X | X | O | X | X | X | |
| | 2 | 1 | O | X | 1 | O | X | X | |
| | 1 | 1 | O | X | 1 | O | 1 | 1 | |

United States Patent Office 3,462,737
Patented Aug. 19, 1969

3,462,737 CHARACTER SIZE MEASURING AND NORMALIZING FOR CHARACTER RECOGNITION SYSTEMS

Davey L. Malaby, Rochester, Minn., assignor to International Business Machines Corporation, New York, N.Y., a corporation of New York Filed Dec. 18, 1964, Ser. No. 419,428
Int. Cl. G06k 9/00
U.S. Cl. 340—146.3 18 Claims This invention relates to measuring and normalizing apparatus and more particularly to apparatus for determining the size of characters to be identified in automatic character recognition systems and still more particularly to character size normalizing apparatus.

This invention finds particular utility in multi-font character recognition systems where identity of the characters is obtained by comparing measurements made on the unknown character with references corresponding to known characters. By dynamically normalizing the size of the character, then the number of reference variations for different fonts can be reduced.

Heretofore, it has been the practice to measure the overall height of characters and normalize on that basis. However, normalizing on the overall height is not particularly advantageous because the line weights vary as much as 15 to 20 mils. Hence, in this invention, normalization takes place on the centerline height.

The characters or patterns are optically scanned by the beam of a conventional flying spot scanner which is caused to sweep a character in a series of horizontally adjacent vertical scans. The height measurement and normalization takes place during a pre-scan of a field of information whereby the scan height of the vertical raster will be properly adjusted during the information scan. A photomultiplier tube collects light reflected from a document as the beam traverses the characters to develop an electrical signal. The vertical scans of a character are essentially digitized or horizontally divided into segments or cells. The optical condition of these cells will be either black or white depending upon whether or not substantial portions of the cells are occupied by the character. A threshold level determines if the optical condition of a cell is black or white. The black and white conditions are represented by binary "one" and "zero" bits respectively. Thus, during each vertical scan, an electrical signal is developed which is digital in time and digital in amplitude. This electrical signal is effectively differentiated to provide the necessary information for making a centerline height measurement. To perform this differentiation, analog, analog-digital or digital techniques can be used. Essentially, the centerline height is derived by making a series of measurements. One measurement is made from the bottom of the lower line of the character to the bottom of the upper line forming the character. Another measurement is made from the top of the lower line to the top of the upper line forming the character. These two measurements are added together and the sum is divided by two to give the centerline height. Whether or not each character will have measurable lower and upper lines depends upon the character style or font.

In a preferred embodiment, a digital technique is used to make the centerline height measurement. Scanning starts from the bottom of a character and considering maximum and minimum line weights a first condition is sought during the lower half of the scan. This first condition is satisfied when the sequential bit configuration 0011 or 00011 is encountered. This provides an indication of detecting the bottom of the lower line of the character. Immediately after the detection of the first condition, the sequenial bit configuration 1100 is sought to satisfy the second condition, i.e., the indication that the top of the lower line has been detected. A third condition is satisfied after predetermined number of segment intervals have elapsed. The third condition eliminates the possibility of detecting middle bars or portions of characters as upper lines. In order to accomplish this, a predetermined number of cells within the vertical scan are not examined or considered for particular sequential bit configurations. By this technique, the center bar of a character such as an E or F will not be mistaken for the upper line of the character. After satisfying conditions one and two and ignoring a predetermined number of sequential bit configurations to satisfy condition three, the fourth condition requiring the sequential bit configuration 00011 is sought to provide an indication of encountering the bottom of the upper line. Immediately after condition four is satisfied, a fifth condition is sought to provide an indication of detecting the top of the upper line. This fifth condition is satisfied upon detecting the sequential bit configuration 1100.

The indications of conditions one, two, three, four, and five being satisfied are used as control signals to determine the number of cells between conditions one and four and between conditions two and five. The total number of cells between conditions one and four and between conditions two and five equal approximately twice the centerline bit height. This amount is then reduced to centerline height each scan over a number of scans to provide a normalized indication or statistical mode of the centerline height. This indication is then used to adjust the vertical scan height of the raster during the scanning of a character for information or recognition purposes.

An alternative approach would be to accumulate the cell positions between conditions one and five and also accumulate line widths, i.e., cells between conditions one and two and between conditions four and five. The centerline height would then equal the number of cells between conditions one and five minus half the number of cells between conditions one and two and between conditions four and five.

Accordingly, a principal object of this invention is to provide improved measuring and normalizing apparatus.

Another object of the invention is to provide improved apparatus for measuring the height of characters.

Another very important object of the invention is to provide apparatus which measures the centerline height of characters.

Still another very important object of the invention is to provide apparatus for measuring the centerline height of characters which provides a signal indicative of the average centerline height of characters within a field.

A more specific object of the invention is to provide apparatus for measuring the centerline height of characters by differentiating an electrical signal generated in response to scanning a section of a character.

Still another specific object of the invention is to provide apparatus which effectively digitally differentiates the electrical signal generated in response to scanning a section of a character.

The foregoing and other objects, features and advantages of the invention will be apparent from the following more particular description of a preferred embodiment of the invention, as illustrated in the accompanying drawings.

In the drawings:

FIG. 1 is a schematic block diagram of the invention;

FIG. 2 consisting of FIGS. 2*a*, 2*b*, 2*c*, 2*d*, 2*e*, 2*f*, 2*g*, 2*h* and 2*i* taken together as shown in FIG. 3 represents a logic circuit diagram of the invention;

Figure 5A:
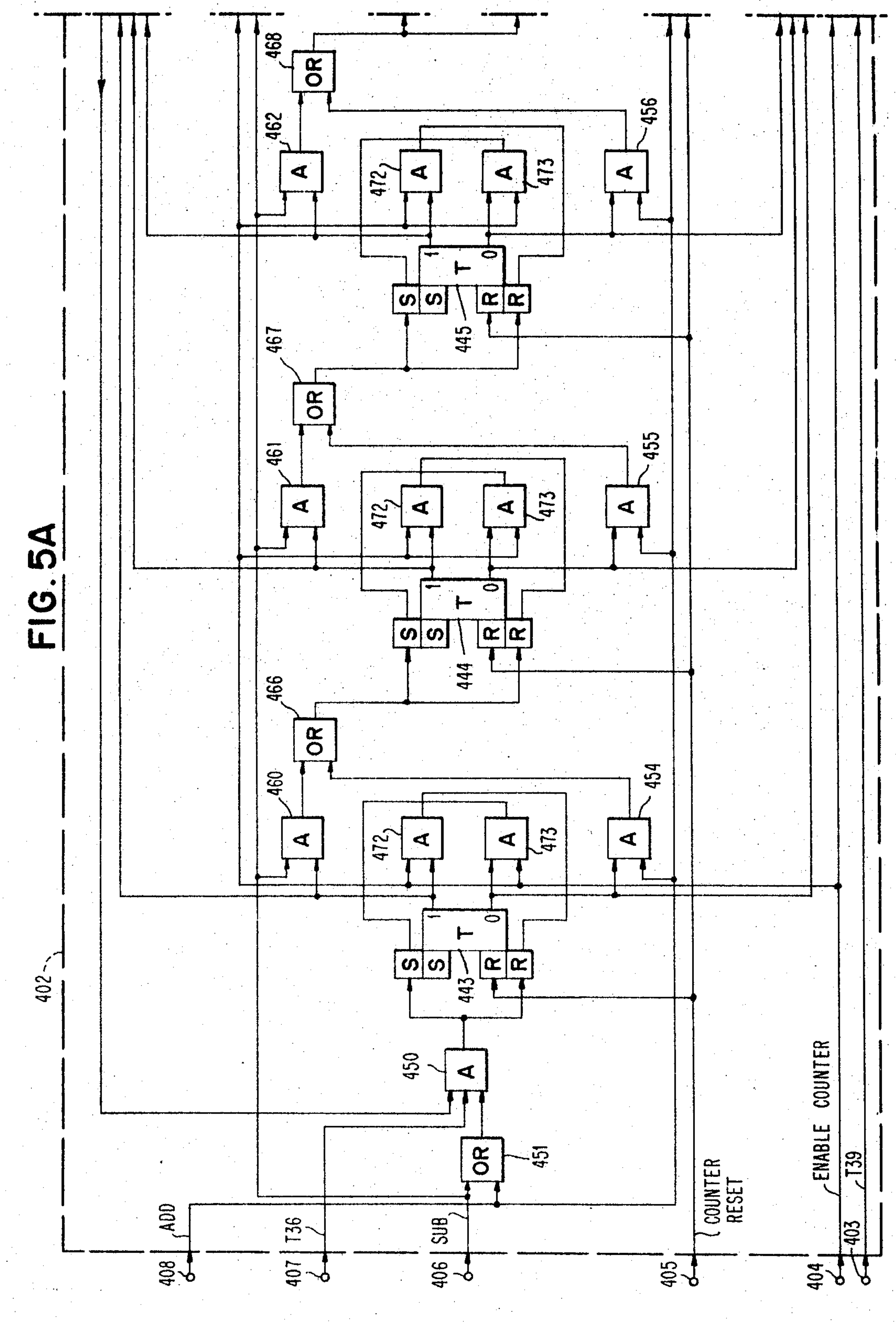
Figure 5B:
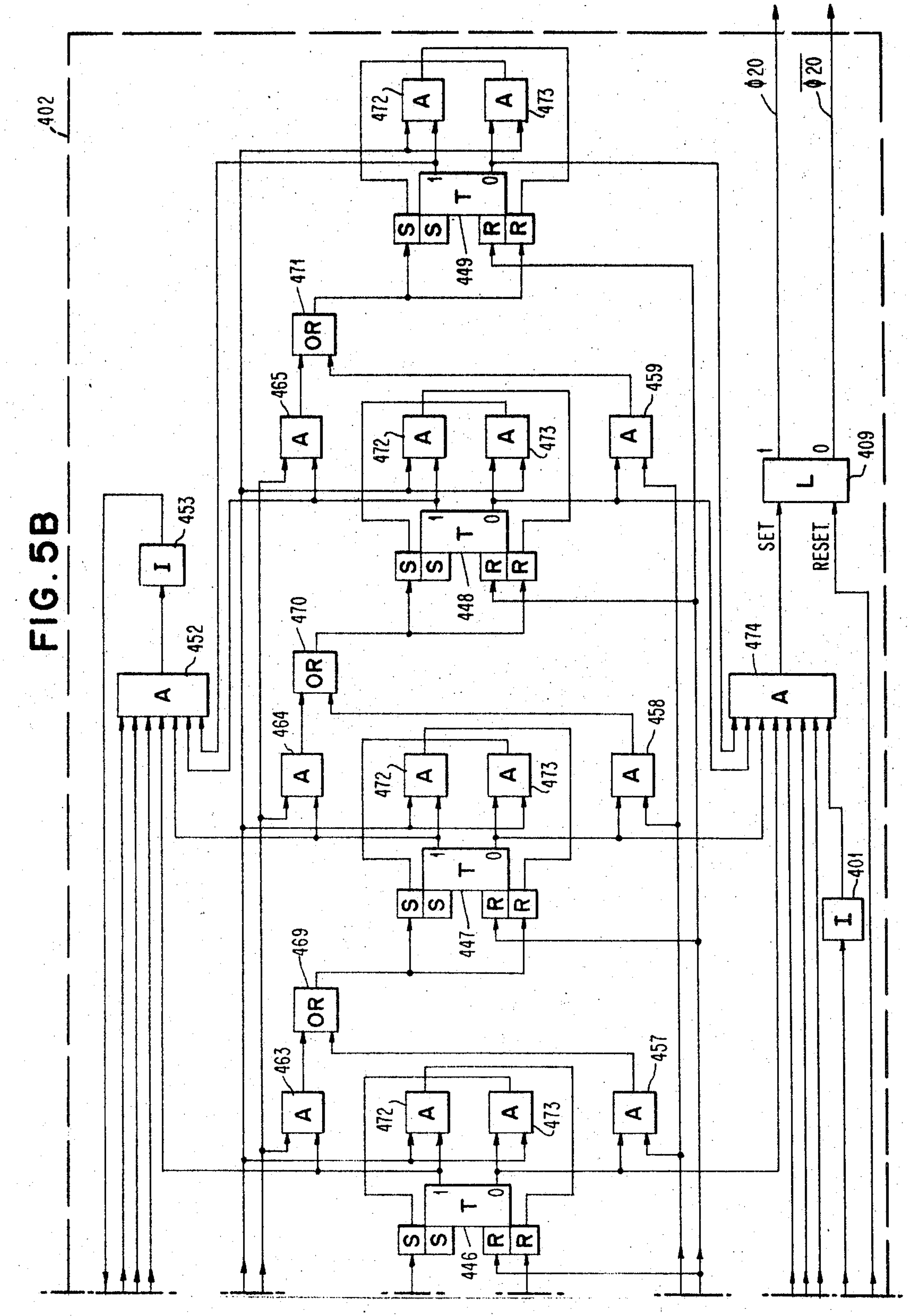
Figures 6, 7:
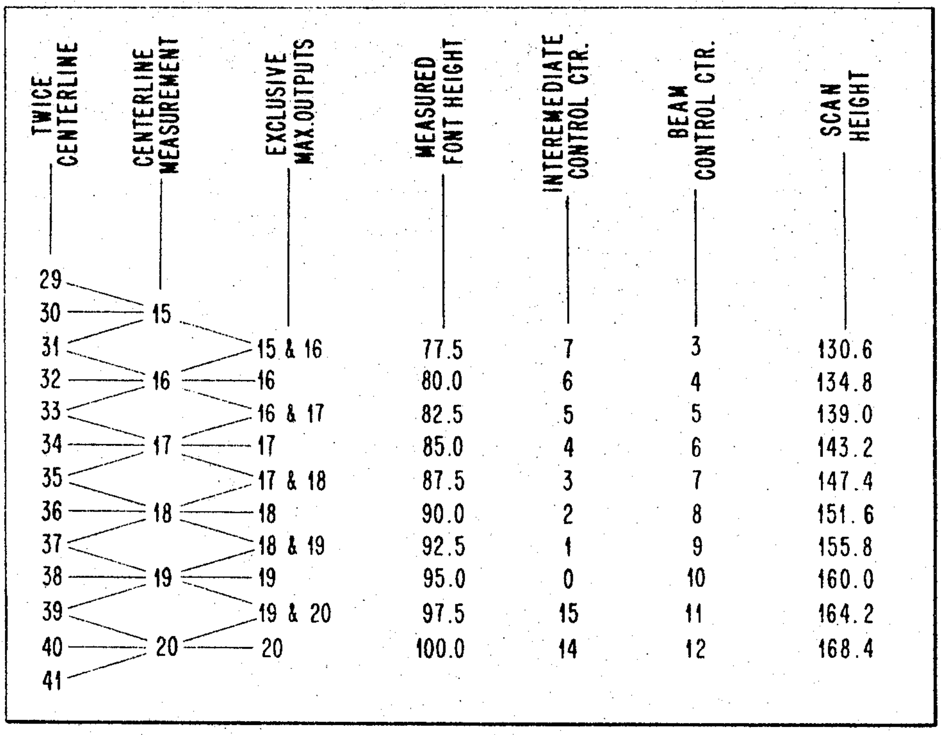
Figure 8:
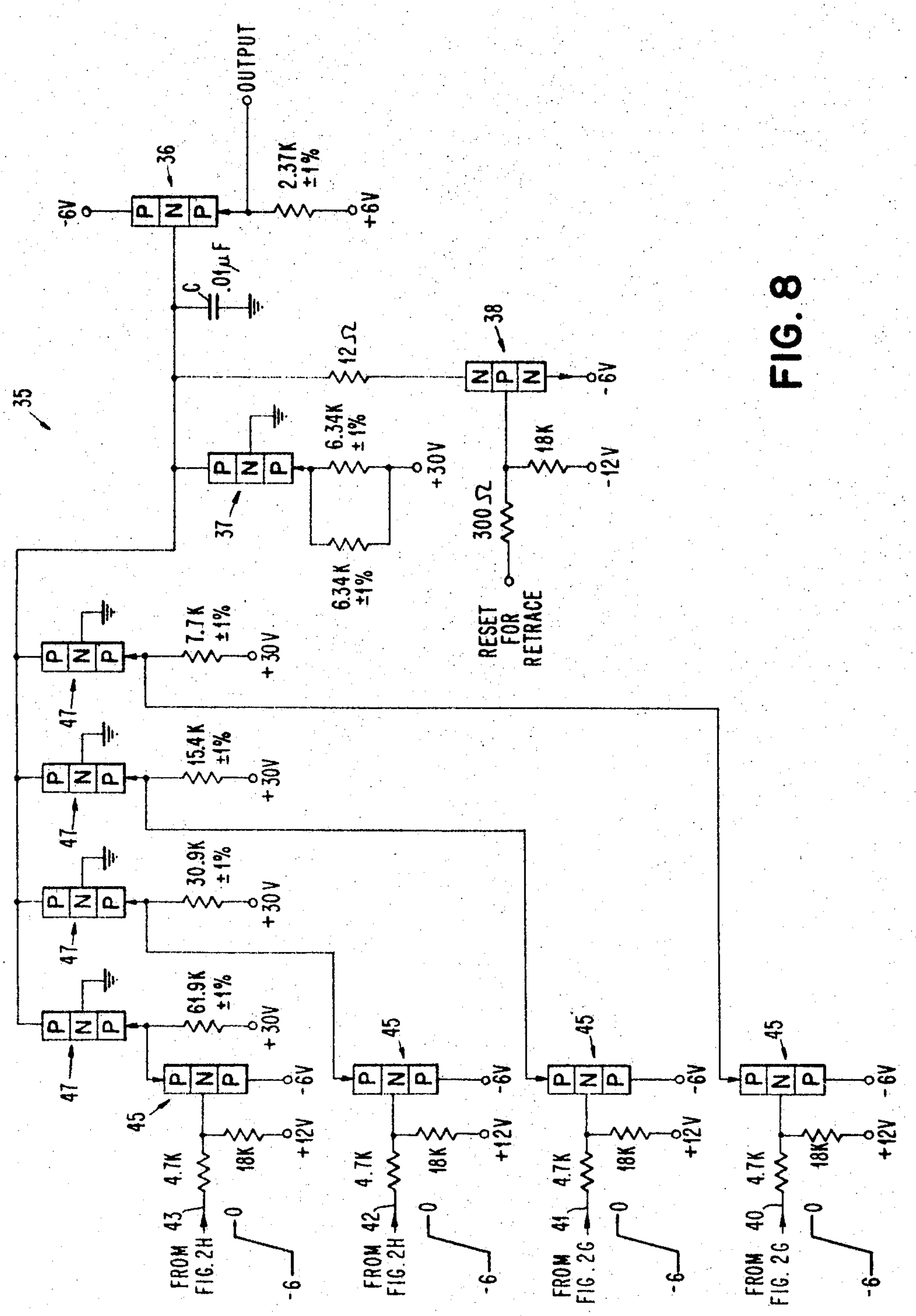
Figure 9:
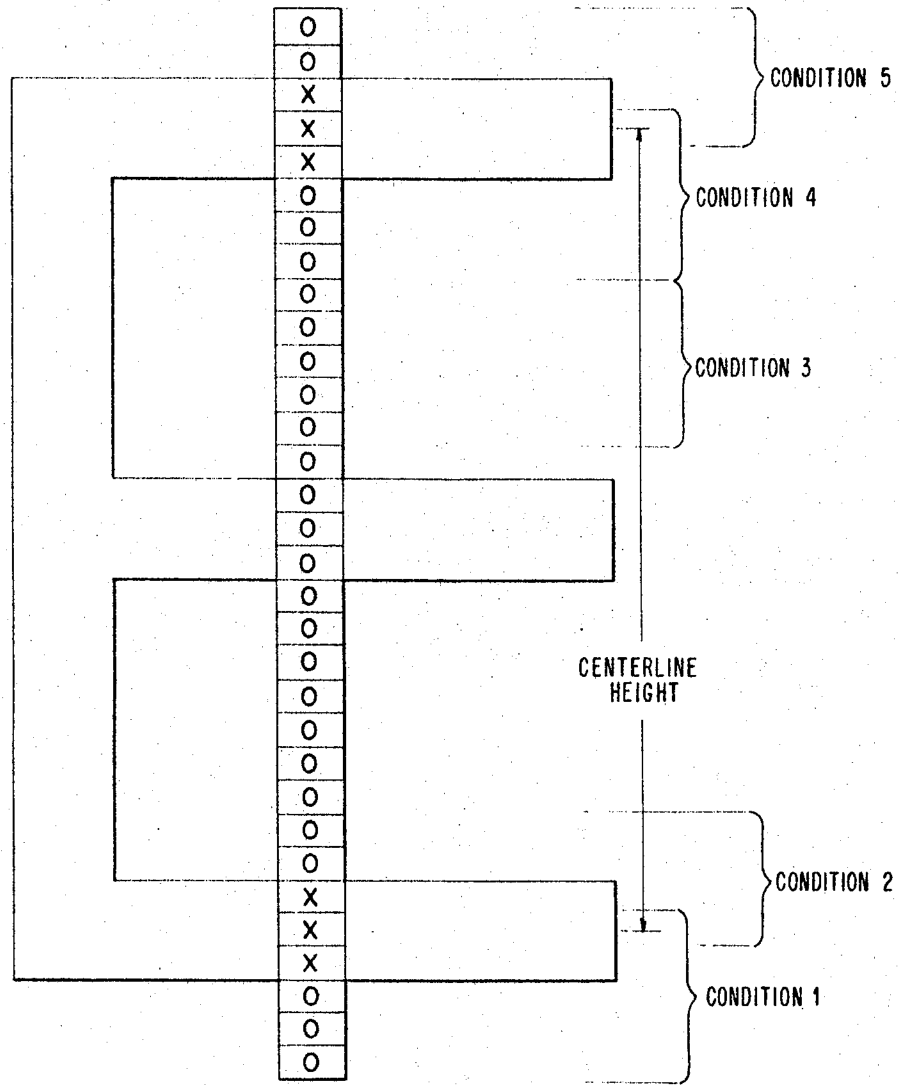

FIG. 5 consisting of FIGS. 5*a* and 5*b* with FIG. 5*b* disposed to the right of FIG. 5*a* is a detail circuit diagram of one of the line center counters;

FIG. 6 is a diagram illustrating the status of the positions of the shift register for the different logic conditions;

FIG. 7 is a chart showing how twice centerline measurements form centerline measurements and from the centerline measurements exclusive maximum outputs are developed to give measured font heights and intermediate control counter values which are used to modify the values in the beam control counter as appropriate and thus adjust the scan heights;

FIG. 8 is a circuit diagram of the vertical character scan circuit of the beam deflection circuit; and, FIG. 9 is a diagram illustrating a typical vertical scan for measuring character height and showing the centerline height and the different logic conditions.

GENERAL

Figure 1:
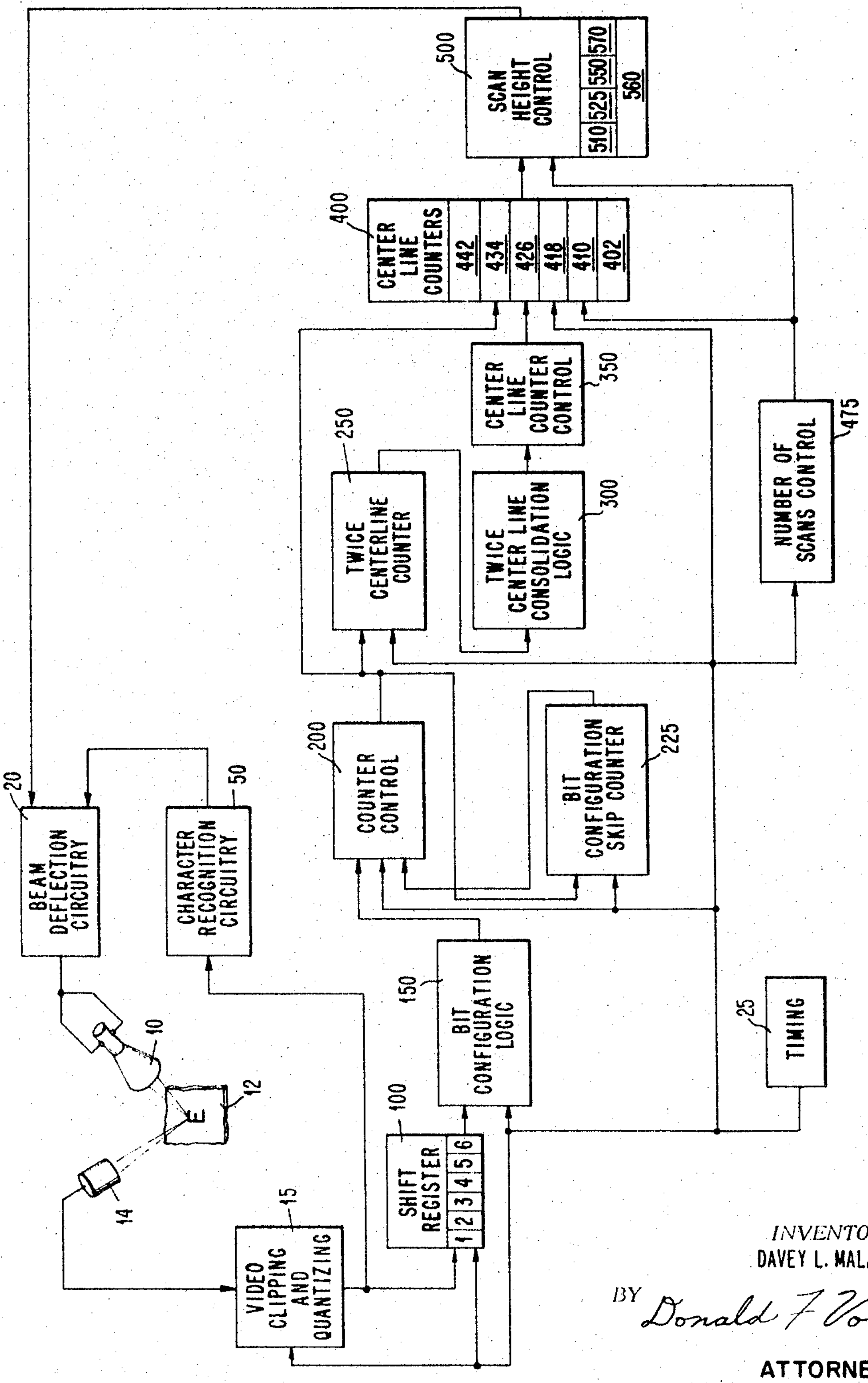

FIG. 1 illustrates the invention by way of example as being incorporated into an automatic character recognition system. It should be remembered that the invention can be used for measuring and normalizing physical distances, the time to complete an event, or a number of events taking place within a period of time. Hence the incorporation of the invention into a character recognition system for the purpose of measuring the heights of characters should not be considered as limiting the scope of the invention.

The character recognition system embodying the invention includes a cathode ray tube scanner 10 for scanning characters on document 12. The beam of cathode ray tube 10 is appropriately deflected in format, character measuring and normalizing, and information scanning modes by beam deflection circuitry 20.

After a line of characters is located and centered upon by format control circuitry, not shown, the beam deflection circuitry 20 is initially operative according to a preset scan height within the font height range under consideration during a pre-scan of a line of characters on document 12 to permit their height to be measured and normalized. Thereafter, the height of the raster scan is adjusted, if necessary, to the normalized character height and then the characters are scanned in an opposite direction for information purposes.

The characters are scanned with a series of horizontally adjacent vertical scans and the beam of the cathode ray tube 10 is reflected from the document 12 to a photomultiplier tube 14. The amount of light reflected from the document background is greater than that reflected from the characters on the document. The photomultiplier tube 14 thus generates an analog signal which will be essentially at two different levels, depending upon whether the beam is being reflected by the background area or by a portion of a character. It should be realized that the beam is quite small relative to the size of a character. The output of the photomultiplier 14 is connected to video clipping and quantizing circuit 15. As the characters are scanned in a series of horizontally adjacent vertical scans, the video clipping and quantizing circuit 15 functions to determine if the optical condition is black or white at incremental times within each vertical scan. In this particular example, each vertical scan is time divided into thirty two horizontal segments under control of timing circuit 25. Each horizontal segment is either black or white.

The output of the video clipping and quantizing circuit 15 is connected to character recognition circuitry 50 and to the input of a shift register 100. The character recognition circuitry 50 establishes the identity of the characters by comparing the black and white bit patterns developed during scanning with reference bit patterns. There is more than one reference pattern for each character because of the fact that characters are printed in different font styles. The number of reference patterns required for each character however, are reduced by this invention because it eliminates the need for having different reference patterns for different sizes of characters. The output of the character recognition circuitry 50 is shown as being connected to the beam deflection circuitry 20 to control the same during the format and character information scan modes. During an information scan, as it will be seen shortly, the height of the raster is determined by the scan height control 500.

The shift register 100 in this example, is a six position shift register for storing the bits in sequence during a vertical raster scan. Only six positions are required in the shift register 100 because only six bits at any one time are examined for determining if certain logical conditions are met. In other words, a sequence of six bits is continually examined during each vertical scan. Obviously, the sequence of the six bits changes during each vertical scan. The bits are entered into the shift register 100 under control of timing circuitry 25. It should be noted that the shift register 100 could also be contained in the character recognition circuitry 50 because that circuitry has the requirement for storing the bits developed during the scanning of a character to permit the bit pattern to be compared with the reference patterns. However, for purposes of clarity, the shift register 100 is shown as being separate from the character recognition circuitry 50. The details of the shift register 100 and the remaining circuits forming the invention will be given in the detailed description of the invention. At this time, only the function of the remaining circuits will be described in order to obtain a general understanding of the invention.

The bit sequence in shift register 100 is examined by bit configuration logic circuitry 150 which functions to determine whether certain conditions exist during each vertical scan. These conditions are illustrated in FIG. 6. The first condition must be satisfied within the first half or fifteen bits of a scan. The first condition is satisfied when the first two positions of the register 100 contain ones and the next three positions contain zeros. The sixth position in this instance is a don't care condition. As it will be seen shortly, the sixth position is used only for determining whether a line is too wide. Such a condition could occur if the line had not really been encountered, such as in the case of a false start.

The second condition must be satisfied within five bit times after the first condition has been satisfied otherwise the abort or reset condition will occur. The second condition is satisfied only after the first condition has been satisfied and the shift register positions one and two contain zero bits. The remaining positions of the shift register are of no concern at this time and therefore, they are represented as don't care conditions.

After the second condition is satisfied, a third condition is sought. However, the states of the positions of the shift register are not examined for the third condition and therefore, they are don't care conditions. The third condition can occur only after the second condition has been satisfied and after the bit configuration skip counter 225 has counted to fourteen. By having the bit configuration skip counter 225 count to fourteen before satisfying the third condition, the middle lines or bars of a character are skipped and will not be mistaken as the upper line of a character.

Once condition three is satisfied, condition four can be sought. The positions of the shift register must have the same bit configuration for condition four as for condition one. When this occurs and condition three has been satisfied, condition four is met. Condition five can occur only after condition four has been met and it will occur when the positions of the shift register have the same bit configuration as they had for satisfying condition two. The abort or reset condition will occur when either of two particular bit configurations occur during a vertical scan. One of these bit configurations is that positions one, five and six of the shift register can have a one. The other condition is when positions one, four and six have a one. When the abort or reset condition occurs, the previous met condition is reset and that condition must then be satisfied again, or the scan will not be considered for the normalizing process.

The bit configuration logic 150 provides signals to counter control 200. When condition one is satisfied, counter control 200 passes as signal bit configuration skip counter 225 and to twice centerline counter 250. Bit configuration skip counter 225 after it is enabled by the signal from counter control 200 counts by one for each subsequent segment of a vertical scan until it reaches a count of fourteen. At that time, as it will be seen shortly, it provides a signal for setting condition three.

Twice centerline counter 250 counts by one for each segment within a vertical scan between conditions one and two. When condition two is satisfied, the twice centerline counter 250 starts to count by two for each segment in the vertical scan until condition four is met. After condition four is met, twice centerline counter 250 again counts by one for each segment until condition five is met.

As twice centerline counter 250 is counting, twice centerline consolidation logic 300 determines the centerline count. In this particular example, if the twice centerline count is an even number, it will develop a single centerline count; and if it is an odd number, it will develop two centerline counts. For example, a count of thirty will develop the single centerline count of 15 whereas a count of 31 develops a centerline count of fifteen and a centerline count of sixteen. Twice centerline bit counts are derived for each scan so that unequal top and bottom line widths can be detected. The twice centerline consolidation logic 300 essentially divides the twice centerline bit count by two and depending upon whether the resultant count is even or odd, either one or two centerline measurements are developed. Each centerline measurement or count is entered into a corresponding centerline counter of centerline counters 400 under control of centerline counter control 350. The centerline counters 400 are then examined or compared after a predetermined number of scans to determine which centerline counter has most often received an entry or is at a maximum. The centerline measurement corresponding to the centerline counter containing the maximum value is then taken as the measured centerline height of the characters scanned.

Consequently, the outputs of the centerline counters 400 are connected to scan height control 500 which examines the condition of counter 400 upon receiving a signal from number of scans control 475. The output of scan height control 500 is connected to beam deflection circuit 20 which is then operated to adjust the height of the scanning raster for the information scan. The aforedescribed data flow is schematically illustrated by the chart of FIG. 7. There it is seen that the twice centerline count provides a centerline count. From the centerline count exclusive maximum outputs are then developed. These exclusive maximum outputs are used to effect the setting of a value in an intermediate control counter of the scan height control 500 as will be described in detail later herein. The value set into the intermediate control counter is used to modify the value in the beam control counter of the scan height control 500. The value in the beam control counter, which is originally pre-set to an initial value, controls the beam deflection circuitry 20 to provide the proper vertical scan height.

In this example, the adjustment of the scan height is controlled in integer values. The ratio of the character centerline height to the scan height at which the characters are initially measured is equal to the ratio of the centerline measurement to the total number of segments per scan. Further, the ratio of the character centerline height to the scan height after normalizing is equal to the normalized centerline height to the total number of segments per scan. The following formula expresses this relationship:

$$R/SI=T/P$$

$$R/SN=N/P$$

where

R=centerline character height
SI=scan height at which characters are measured
T=centerline measurement
P=total segments per scan
SN=normalized scan height
N=normalized centerline segment height count therefore $$T(SI)=N(SN)$$

$$SN=T\frac{SI}{N}$$

and $$SI=C\Delta s$$

$$SN=(C+k)\Delta s$$

where $\Delta s$=change in scan height per integer character
C=integer associated with SI
$k$=integer necessary to obtain normalized scan height SN Thus $$(C+k)\Delta s=T\frac{C\Delta s}{N}$$

or $$k=\frac{SI}{\Delta s}\left(\frac{T}{N}-1\right)$$

By choosing $\Delta s=SI/(a)N$ where $(a)$ is the resolution factor $$k=a(T-N)$$

SI and N are chosen in relation to the font size range to be measured and the resolution of the scanning system.

From the foregoing it is seen that the centerline height of characters is measured by vertically scanning the characters where each vertical scan is divided into thirty-two horizontal segments. During the vertical scan of the characters, the existence of particular bit configurations entered into shift register 100 as ascertained by the bit configuration logic 150. A twice centerline count is then obtained in counter 250 under counter control 200 and bit configuration skip counter 225. The twice centerline count is then reduced to a centerline counter by twice centerline consolidation logic 300 and this centerline count is entered into centerline counters 400 under control of centerline counter control 350. At least one of the centerline counters 400 is at a maximum for each vertical scan. At the end of a predetermined number of scans, the maximum centerline counter 400 operates scan height control 500. Scan height control 500 develops a value which is transferred to the beam deflection circuitry 20 which in turn controls the raster height of the vertical scan for an information scan.

While the invention has been generally described, a detailed description will now be given.

DETAILED DESCRIPTION

In this particular example, the cathode ray tube 10, the photomultiplier 14 and the video clipping and quantizing circuit 15 are considered to be conventional elements and further description thereof is unnecessary.

Timing

Figure 2A:
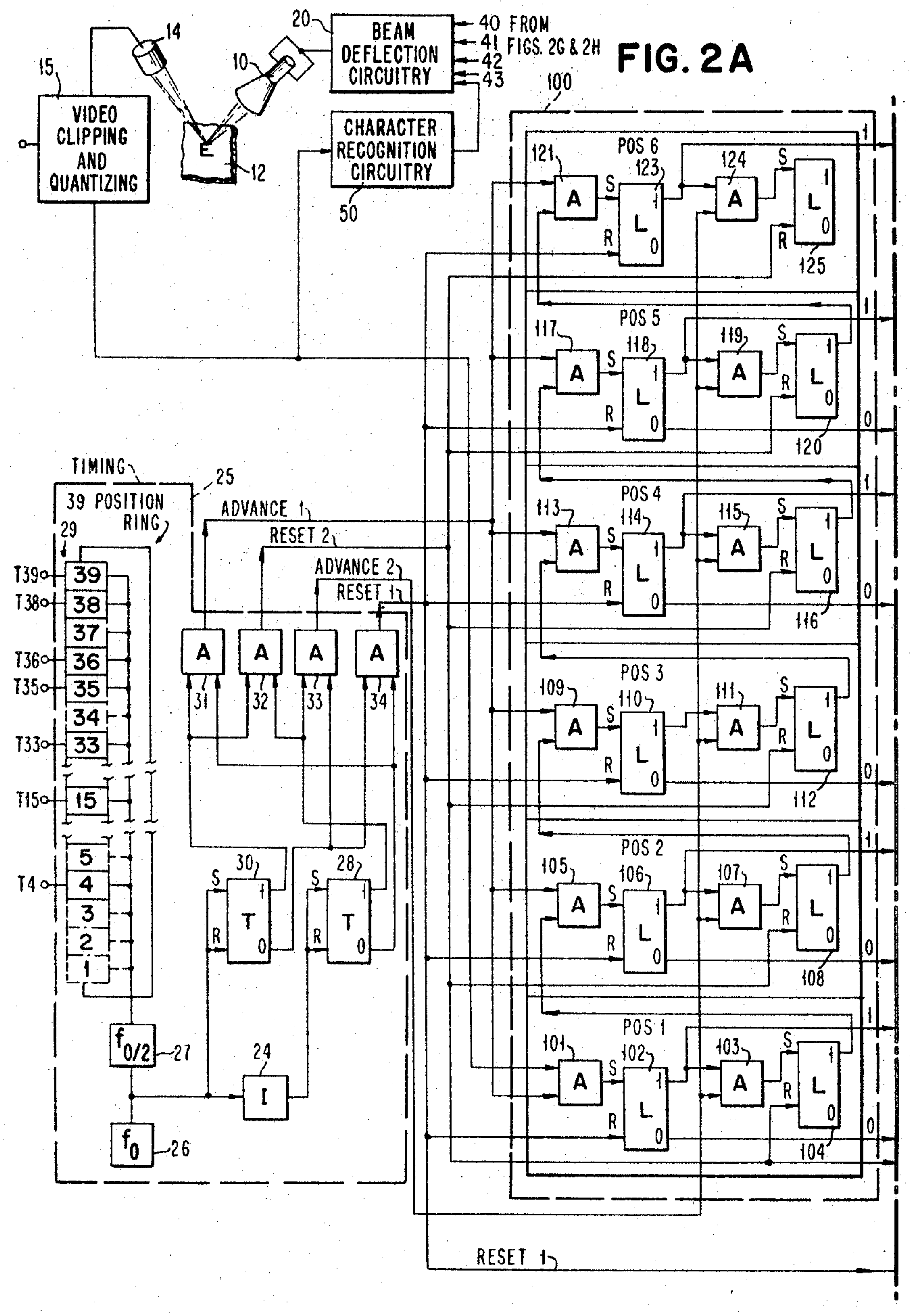
Figure 4:
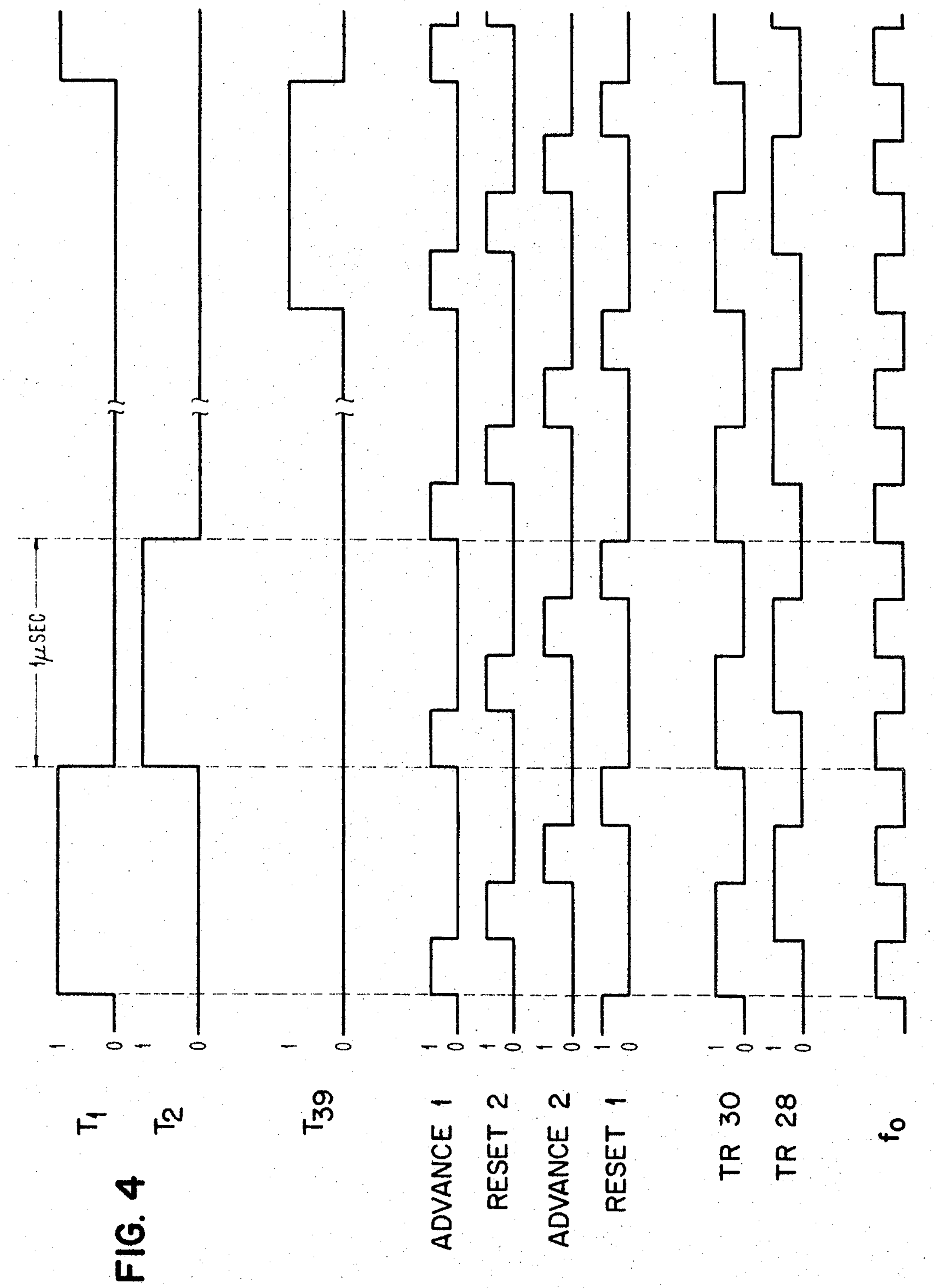
FIG. 4 is a timing diagram for the pulses from the timing circuit.

The timing circuitry 25, FIG. 2*a*, includes a clock 26 having a basic frequency of *fo*. The output of the clock 26 is connected to the input of a frequency divider 27, to the binary inputs of a trigger 30 and to the input of an inverter 24. The output of the frequency divider 27 is connected to inputs of a thirty-nine position ring 29. Thirty-two positions of the ring 29 are used to divide the vertical scan into thirty-two horizontal segments. The other seven positions of the ring 29 are used for other purposes, such as to provide gating and resetting pulses etc., as will be seen later herein. Each stage of the ring 29 has an output for approximately one microsecond. The timing for the pulses is shown in FIG. 4.

The output of inverter 24 is connected to binary inputs of trigger 28. The set output of the trigger 28 is connected to inputs of logical AND circuits 32 and 33. The reset output of trigger 28 is connected to inputs of logical AND circuits 31 and 34. The set output of trigger 30 is connected to inputs of logical AND circuits 31 and 32 while the reset output thereof is connected to inputs of logical AND circuits 33 and 34. The output of logical AND circuits 31, 32, 33 and 34 are labeled as Advance 1, Reset 2, Advance 2 and Reset 1, respectively.

When logical AND circuit 31 has an output, the Advance 1 pulse gates the information from the video clipping and quantizing circuit 15 into the first position of the shift register 100. The output of the video clipping and quantizing circuit 15 is connected to an input of logical AND circuit 101 which also has an input connected to the output of logial AND circuit 31 for receiving the Advance 1 pulse. The output of the logial AND circuit 101 is connected to the set terminal of information bit latch 102. The Reset 2 pulse is the next occurring pulse and it resets a storage latch 104 in register 100. The output of logical AND circuit 32 is connected to the reset input of storage latch 104. Hence, whenever a Reset 2 pulse occurs storage latch 104 is reset. The Advance 2 pulse, which occurs next, transfers the bit condition of the information bit latch 102 to the storage latch 104. The output of logical AND circuit 33 is connected to one input of logical AND circuit 103 which has another input connected to the set output of information bit latch 102. The output of logical AND circuit 103 is connected to the set input of storage latch 104. The Reset 1 pulse then resets the information bit latch 102 to enable it to receive the next bit of information from the video clipping quantizing circuit 15. The output of logical AND circuit 34 is connected to the reset input of information bit latch 102.

Shift register

The shift register 100 can be a separate register as shown or it can be part of the character recognition circuitry 50. In either case, each position of the register has bipolar outputs. The shift register 100 can be any suitable register where each position provides bipolar outputs and in this particular example each position includes an information bit latch and a storage bit latch. Each position of the register has a set output for indicating that a bit was stored and a reset ouptut for indicating that a bit was not stored.

In order to fully appreciate the construction and operation of the shift register 100, the register input and first two positions will be described. The output of the video clipping and quantizing circuit 15 is connected to an input of logical AND circuit 101. Logical AND circuit 101 also has an input connected to the output of logical AND circuit 31 of the timing circuit 25 for receiving an Advance 1 signal. The output of the logical AND circuit 101 is connected to the set terminal of the information bit latch 102.

The set output of the information bit latch 102 provides one output from position one of the register 100 and its reset output provides the other. The set output is also connected to an input of logical AND circuit 103 which also has an input connected to the output of logical AND circuit 33 of the timing circuit 25 for receiving an Advance 2 signal. The output of the logical AND circuit 103 is connected to the set terminal of store latch 104. The reset input of the information bit latch 102 is connected to the output of logical AND circuit 34 of the timing circuit 25 for receiving a Reset 1 signal and the reset input of store latch 104 is connected to the output of logical AND circuit 32 of the timing circuit 25 to receive the Reset 2 signal.

The set output of the store latch 104 is connected to an input of a logical AND circuit 105 which has another input connected to the output of logical AND circuit 31 of the timing circuit 25 for receiving the Advance 1 signal. The output of the logical AND circuit 105 is connected to the set input terminal of information bit latch 106.

The set and reset outputs of information bit latch 106 are the bipolar outputs of the second position of the register 100. The set output of information bit latch 106 is also connected to an input of a logical AND circuit 107 which also has an input connected to the output of logical AND circuit 33 to receive an Advance 2 pulse. The output of logical AND circuit 107 is connected to the set input terminal of store latch 108. The reset inputs of latches 106 and 108 are connected to the outputs of logical AND circuits 34 and 32, respectively.

It is thus seen that the outputs for each position of the register are taken from the information bit latch and that the set output of the information bit latch is connected to set the associated store latch which receives the information from the bit latch at Advance 2 time. The store latches had previously been reset at Reset 2 time. Further, it is seen that the set output of the store latch of one position is connected to set the information bit latch of an adjacent position and the information is transferred at Advance 1 time. The information bit latches are then reset at Reset 1 time. By this arrangement, the information in each storage position is transferred to the adjacent storage position at Advance 1 time. The information bit latches are reset only after the information therein has been transferred to the associated store latches. The associated store latches are reset prior to receiving the information from the information bit latches. The bipolar outputs from the information bit latches of the shift register 100 are made available to the bit configuration logic circuitry 150.

Bit configuration logic

Figure 2B:
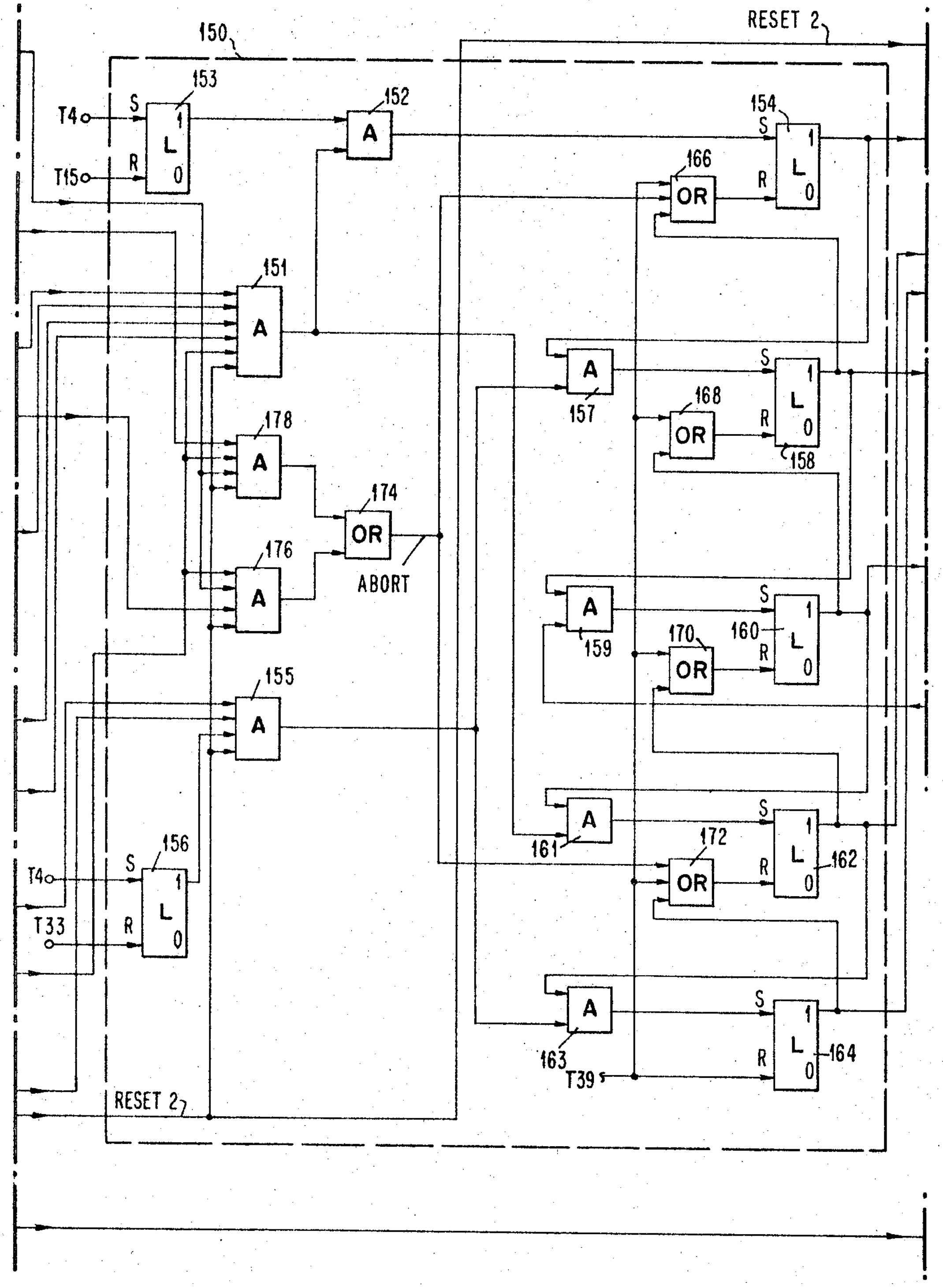

The bit configuration logic 150, FIG. 2*b* examines the positions of the register 100 dynamically to ascertain the bit conditions therein. If certain bit configuration sequences exist, the bit configuration logic 150 develops output signals to counter control 200, FIG. 2*c*.

Logical AND circuit 151 is sampling the shift register 100 for the bit configuration 0011 and 00011 which indicates that the bottom of a character is encountered by the beam of the cathode ray tube 10. When this occurs, condition one is met or satisfied. Consequently, logical AND circuit 151 has inputs connected to the reset outputs of the fifth, fourth and third positions and inputs connected to the set outputs of the second and first positions of the register 100. Logical AND circuit 151 also has an input connected to the output of logical AND circuit 32 of timing circuit 25 for receiving a Reset 2 pulse. Hence, logical AND circuit 151 will have an output at Reset 2 time if the bit conditions in the register 100 are 00011 for bit positions 5 through 1 respectively.

In order to meet the requirement that condition one be satisfied, in the first half of the vertical scan, the output of logical AND circuit 151 is connected to an input of logical AND circuit 152 which has another input connected to the set output of a latch 153. The set and reset inputs of latch 153 are connected to the fourth and fifteenth positions of ring 29, respectively. Hence, logical AND circuit 153 will be conditioned only between T4 and T15 time. The output of logical AND circuit 152 is connected to the set terminal of the first condition latch 154.

The second condition to be satisfied is the bit configuration of 1100 occuring after the first condition has been satisfied. Logical AND circuit 155 examines the shift register 200 for this bit configuration and has inputs connected to the reset outputs of the first and second positions of the register 100. Since the second condition can only be satisfied after the first condition has been met, it is unnecessary to examine any of the other positions of the shift register. Logical AND circuit 155 also has an input connected to the output of logical AND circuit 32 of timing circuit 25 for receiving the Reset 2 pulse. It also has an input connected to the set output of a latch 156 which has its set and reset terminals connected to the fourth and thirty third position of the ring 29, respectively. The output of logical AND circuit 155 is connected to an input of logical AND circuit 157 the same also having an input connected to the set output of the first condition latch 154. The output of logical AND circuit 157 is connected to the set terminal of a condition two latch 158.

Condition three cannot occur until after condition two has been satisfied and after a predetermined number of bit times or segments within a vertical scan have been skipped. Hence, the set input of condition three latch 160 is connected to the output of a logical AND circuit 159 which has an input connected to the set output of the condition two latch 158 and an input connected to an output of the bit configuration skip counter 225 which indicates that it has counted to fourteen.

After condition three has been satisfied, the bit configuration of 00011 in positions five through one of the register 100 is sought to satisfy condition four. This bit configuration is determined by the logical AND circuit 151 which was also used to determine the bit configuration for satisfying condition one. It should be noted at this time that condition one could also be satisfied by the bit configuration of 0011 because initially the register 100 is reset and therefore the set output of the fifth position thereof will be a zero at the time the bit configuration 0011 is in positions four through one, respectively, and consequently the inputs to logical AND circuit 151 will be satisfied by T4 time and therefore logical AND circuit 151 will have an output to set the condition one latch 154. However, thereafter, the register 100 will have information as determined by the scanning of the characters and consequently the bit configuration 00011 must exist in order to satisfy condition four. The condition four latch 162 has its set terminal connected to the output of a logical AND circuit 161 which has an input connected to the set output of the condition three latch 160 and an input connected to the output of logical AND circuit 151.

After condition four is met, the bit configuration of 1100 in register 100 will be sought to satisfy condition five. Since this condition is the same as for condition two, logical AND circuit 155 also examines the register 100 for condition five. However, the condition five cannot occur until after condition four occurs because the set output of condition four latch 162 is connected to an input of logical AND circuit 163. Logical AND circuit 163 also has an input connected to the output of logical AND circuit 155 and its output is connected to the set input of condition five latch 164.

The set outputs of the condition latches 154, 158, 160, 162 and 164 are connected to inputs of the counter control circuit 200. Additionally, these condition latches are each reset at T39 time. The thirty-ninth position of the timing ring 29 is connected to inputs of logical OR circuits 166, 168, 170, 172 and to the reset input of fifth condition latch 164. The logical OR circuit 166 which has its output connected to the reset terminal of the condition one latch 154 also has inputs connected to the output of logical OR circuit 174 and the set output of the condition two latch 158.

Logical OR circuit 174 has an output for indicating that the second and fifth conditions are not satisfied in five bit times after satisfying conditions 1 and 4, respectively. Logical AND circuit 176 has inputs connected to the set outputs of the first, fourth and sixth position of the register 100 and an input connected to the output of logical AND circuit 32 of timing circuit 25 for receiving a Reset 2 signal. Logical AND circuit 178 has inputs connected to the set outputs of the first, fifth, and sixth position of the register 100 and an input connected to the output of logical AND circuit 32 of timing circuit 25 for receiving a Reset 2 signal.

Condition latches 158, 160 and 162 have their reset terminals connected to outputs of logical OR circuits 168, 170 and 172, respectively. Logical OR circuit 168 has an input connected to the thirty-ninth position of the timing ring 29 and to the set output of condition latch 160. Similarly, logical OR circuit 170 has an input connected to position thirty-nine of ring 29 and to the set output of latch 162. Logical OR circuit 172 has an input connected to position thirty-nine of the timing ring 29, an input connected to the output of logical OR circuit 174 and an input connected to the set output of condition latch 164. It is seen that each condition latch has the capability of resetting the previous adjacent condition latch upon being set. Further, if logical OR circuit 174 has an output, condition one and four latches 154 and 162 are reset and these conditions then must be satisfied for a second time in order for the particular scan to qualify in the measuring process.

Counter control

The counter control circuit 200 receives signals from the bit configuration logic 150 and has outputs connected to the bit configuration skip counter 225, the twice centerline counter 250 and the centerline counters 400. During the time that conditions one and four exist, the twice centerline counter 250 counts by one. This control is achieved by connecting the set outputs of condition latches 154 and 162 to inputs of logical OR circuit 201. The output of logical OR circuit 201 is connected to inputs of logical AND circuits 202 and 203 and to the input of an inverter 207. The logical AND circuit 202 has its output connected to an input of logical OR circuit 204. The logical AND circuit 202 also has an input connected to the output of logical OR circuit 204. Hence, this constitutes a latch arrangement. Logical OR circuit 204 also has inputs connected to the outputs of logical AND circuits 203 and 205. The logical AND circuit 203 additionally has inputs connected to the outputs of inverters 206 and 212. The inverter 206 has its input connected to the output of logical AND circuit 32 which output is also connected to inputs of logical AND circuits 205 and 211. The inverter 212 has its input connected to the output of logical OR circuit 210. Logical OR circuit 210 will not have an output when there is a signal from logical OR circuit 201 because the output of inverter 207 will be down and thus logical AND circuit 208 will not pass a signal to logical OR circuit 210. Since logical OR circuit 210 does not have an output signal the output of inverter 212 will be up and logical AND circuit 203 will be conditioned to pass a signal furnished by logical OR circuit 201 when the Reset 2 pulse goes away. The signal passed by logical AND circuit 203 is also passed by logical OR circuit 204 to logical AND circuits 202 and 205. Logical AND circuit 202 then has an output signal as long as there is a signal from logical OR circuit 201. Logical AND circuit 205 has an output signal only for every Reset 2 pulse because its other input is connected to the output of logical AND circuit 32. The output of logical AND circuit 205 is connected to an input of logical OR circuit 204 and to the input of an inverter 251 of the twice centerline counter 250, FIG. 2*d*. The output of the inverter 251 is connected to the set and reset terminals of trigger 254 for the first position of the counter 250. Hence, counter 250 will be advanced by one every time a Reset pulse 2 goes away when logical AND circuit 205 is conditioned.

The counter 250 is conditioned to count by two's by a signal from logical OR circuit 218. Logical OR circuit 218 has inputs connected to the set outputs of latches 158 and 160. Hence, counter 250 counts by two between conditions one and four when conditions two and three are satisfied. The output of logical OR circuit 218 is connected to inputs of logical AND circuits 208 and 209. Logical AND circuit 208 also has inputs connected to outputs of inverters 206 and 207. The output of logical AND circuit 208 is connected to an input of logical OR circuit 210. Hence, logical AND circuit 208 and logical OR circuit 210 have an output when it is not Reset 2 time and the logical OR circuit 201 does not have an output signal. The output of logical OR circuit 210 is connected to inputs of logical AND circuits 209 and 211. Logical AND circuit 209 also has an input connected to the output of logical OR circuit 218. Hence, logical AND circuit 209 forms a latch with logical OR circuit 210 and will have an output signal to logical OR circuit 210 as long as there is an input signal from logical OR circuit 218. Logical AND circuit 211 has inputs connected to the output of logical OR circuit 210 and logical AND circuit 32. The output of logical AND circuit 211 is connected to an input of logical OR circuit 210 and to an input of logical OR circuit 253 of counter 250. The output of logical OR circuit 253 is connected to the input of an inverter 255 which has its output connected to the set and reset inputs of trigger 256 for the second position of counter 250. Hence, counter 250 is advanced by two every time Reset 2 falls when there is an output from logical OR circuit 210.

Figure 2C:
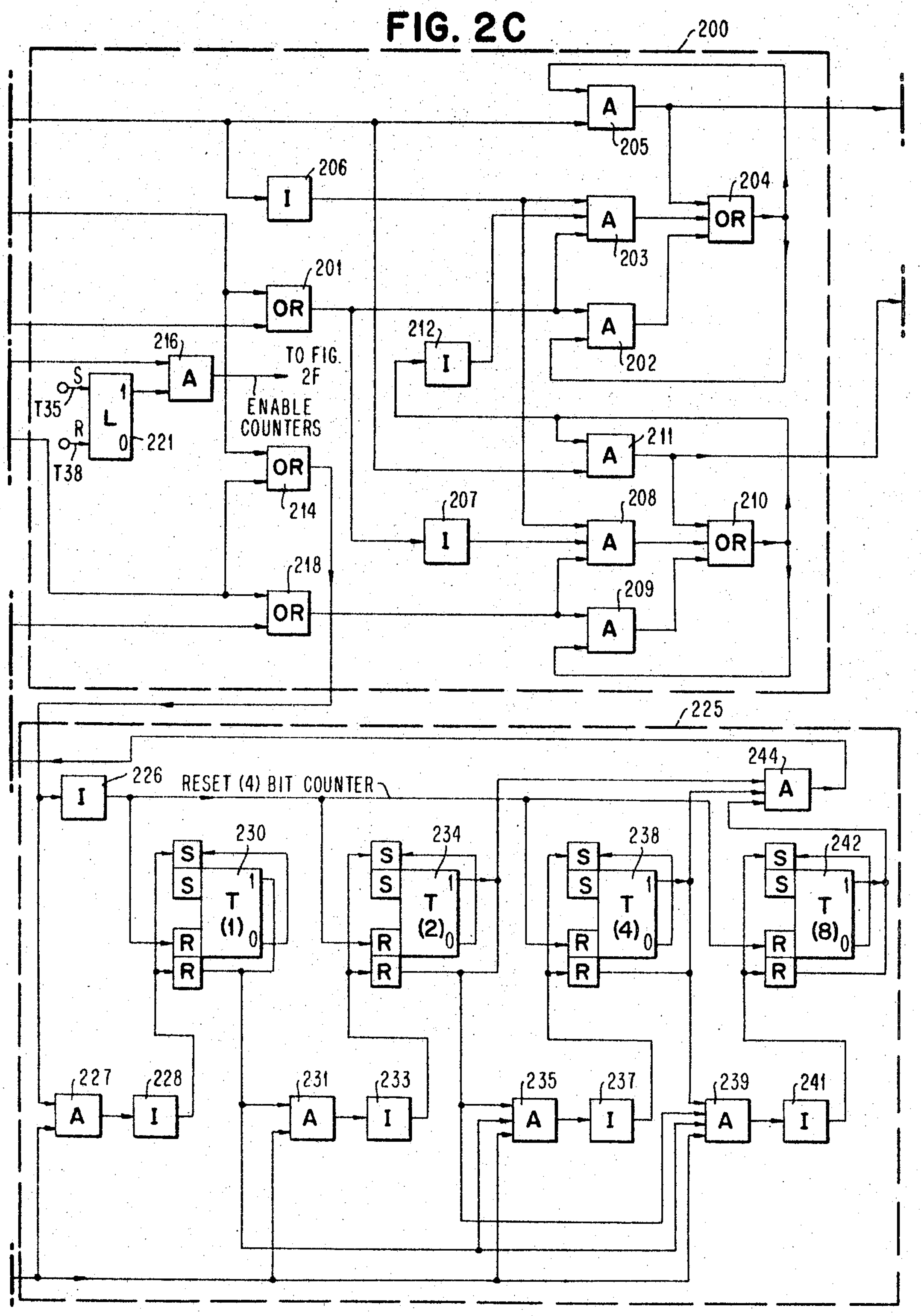

In order to skip a predetermined number of segments or bit times within a vertical scan, before looking for condition three, the bit configuration skip counter 225, FIG. 2*c*, is activated after satisfying condition one. However, since condition two resets condition one, it is necessary to also use condition two for controlling the operation of the bit configuration skip counter 225. Thus, the set outputs of condition latches 154 and 158 are connected to inputs of logical OR circuit 214 which has its output connected to inputs of inverter 226 and logical AND circuit 227 the bit configuration skip counter 225. The operation of this counter will be described shortly.

Figure 2D:
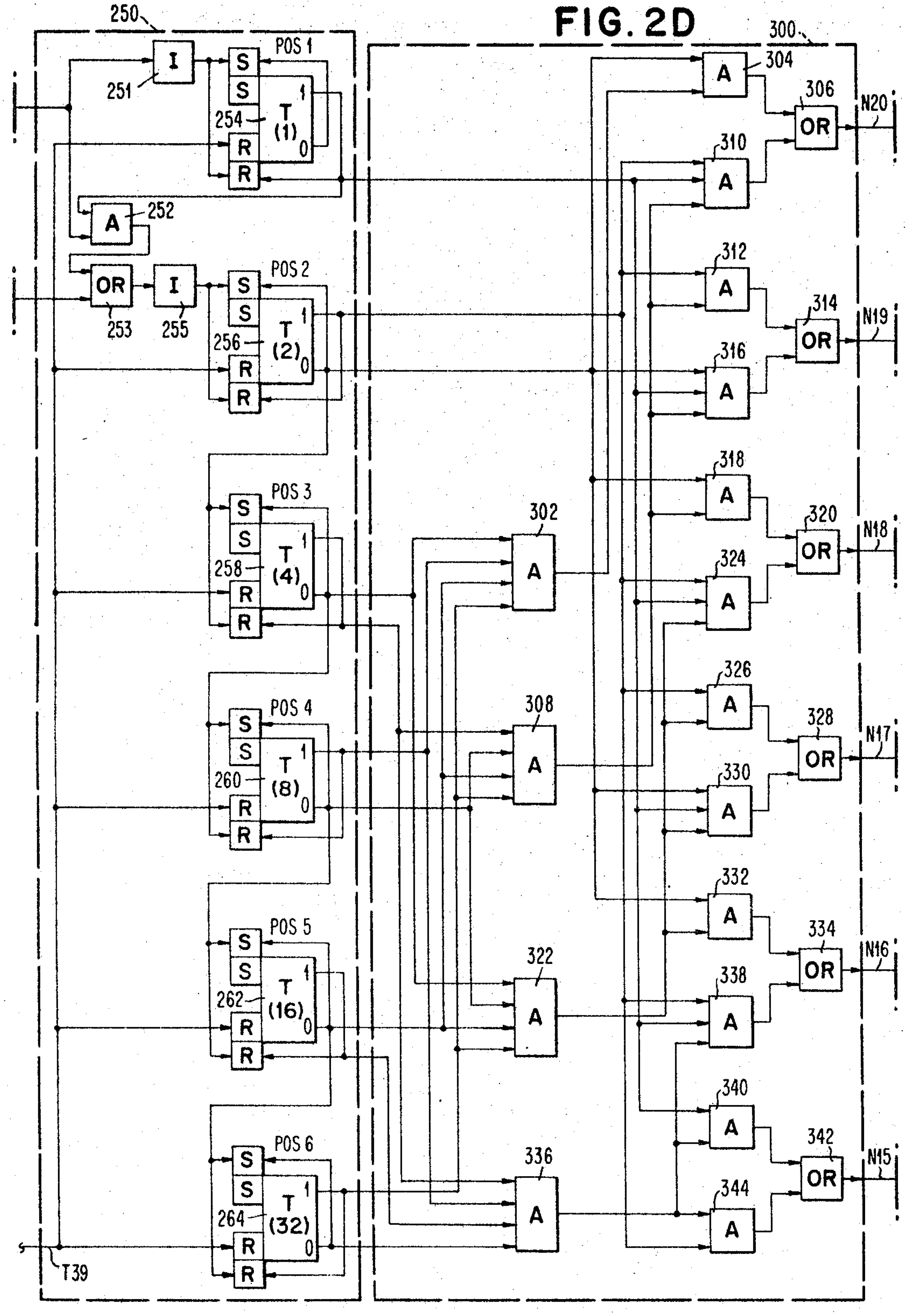
Figure 2E:
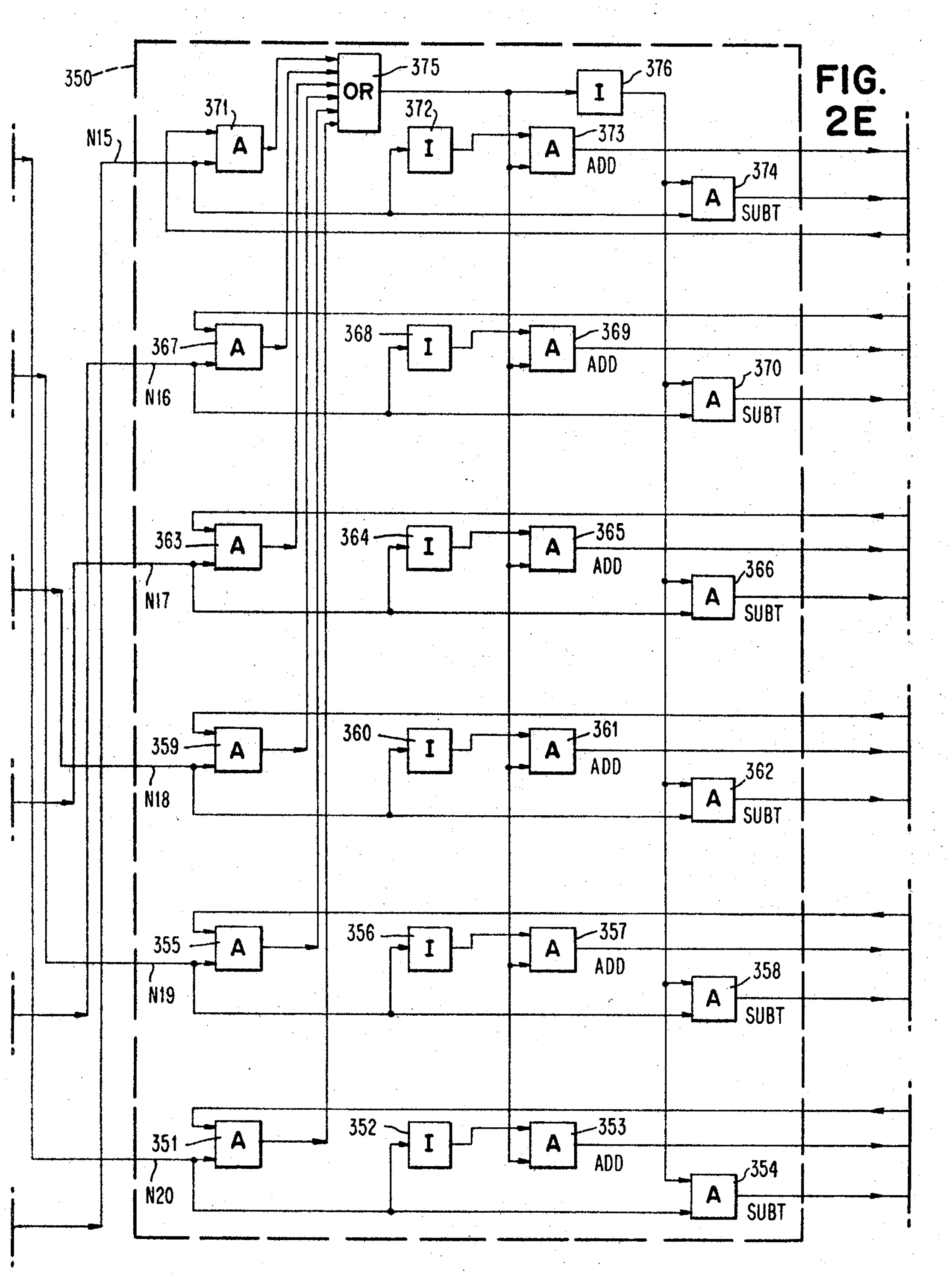
Figure 2F:
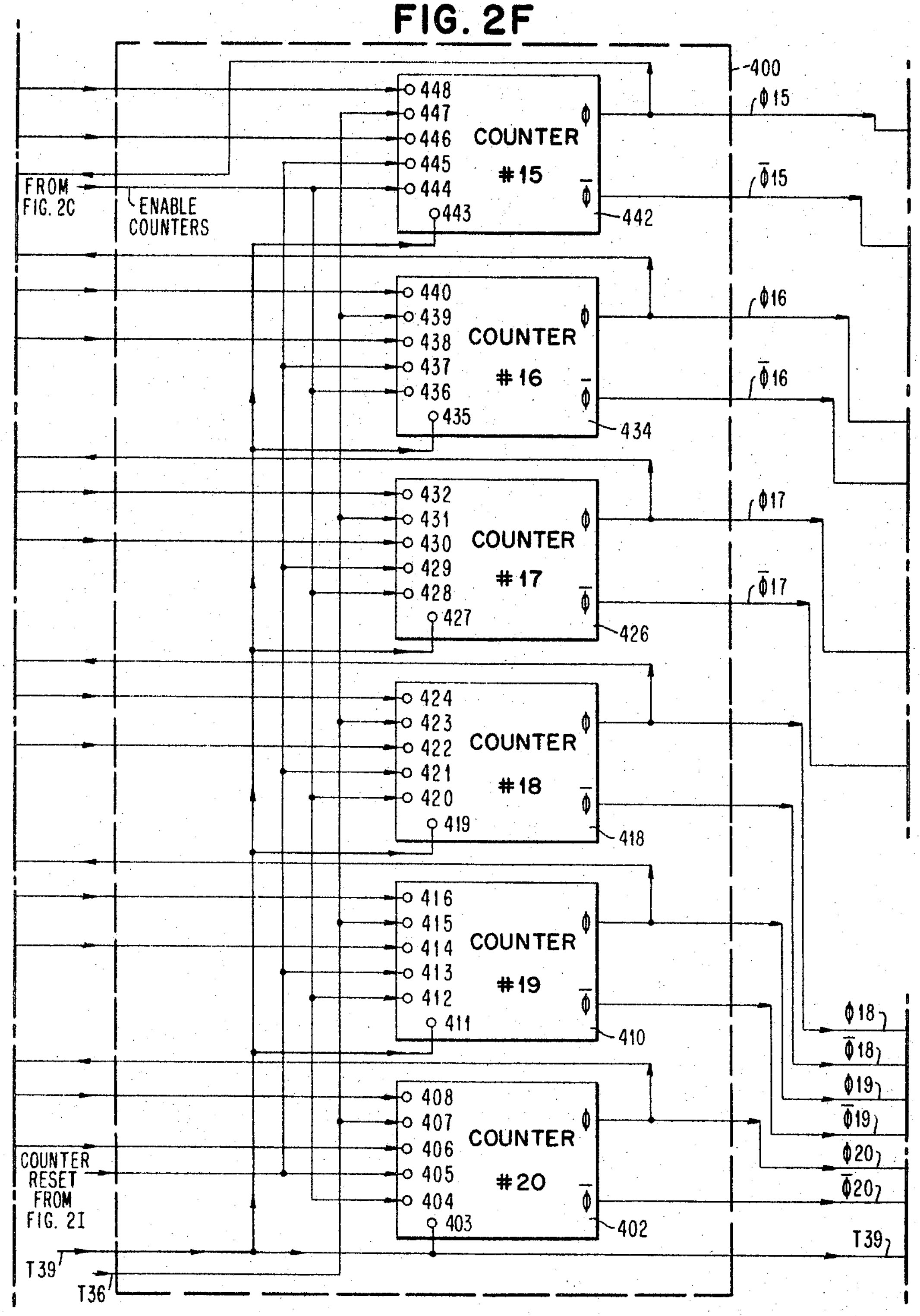

Rfter condition five is satisfied, the centerline counters 400, FIG. 2*f*, are enabled. This is accomplished by connecting the set output of the condition five latch 164 to an input of logical AND circuit 216 which also has an input connected to the set output of condition latch 221 representing a sixth condition. Condition latch 221 has its set and reset terminals connected to the timing ring 29 for receiving T35 and T38 pulses, respectively. The output of logical AND circuit 216 is connected to the inputs of centerline counters 400.

Bit configuration skip counter

The bit configuration skip counter 225 is a four position binary counter consisting of triggers 230, 234, 238 and 242. These triggers have their A.C. set and reset inputs connected to the outputs of inverters 228, 233, 237 and 241, respectively. These inverters have their inputs respectively connected to outputs of logical AND circuits 227, 231, 235 and 239. The D.C. reset inputs of triggers 230, 234, 238 and 242 are connected to the output of inverter 226. Hence, the counter 225 is reset before it starts counting because inverter 226 has an output before condition one is satisfied.

Logical AND circuits 227, 231, 235 and 239 each have an input connected to the output of logical AND circuit 34 for receiving a Reset 1 pulse. Hence, the positions of the counter 225 are adapted to be advanced simultaneously by the Reset 1 pulse. The output of logical AND circuit 227 is connected to an input of inverter 228 which has its output connected to the set and reset terminals of trigger 230. The set output of trigger 230 is connected to inputs of logical AND circuits 231, 235, and 239. The set and reset outputs of trigger 230 are also connected to its A.C. reset and set inputs, respectively, to condition the same.

The output of logical AND circuit 231 is connected to the input of inverter 233, the same having its output connected to the set and reset input terminals of trigger 234. The set output of trigger 234 is connected to inputs of logical AND circuits 235, 239 and 244. Also the set and reset outputs of trigger 234 are connected to its A.C. reset and set inputs respectively to condition the same. Logical AND circuit 235 has an output connected to the input of inverter 237 whose output is connected to the A.C. set and reset inputs of trigger 238. The set output of trigger 238 is connected to the inputs of logical AND circuits 239 and 244. The set and reset outputs of trigger 238 are connected to its A.C. reset and set inputs respectively to condition the same. The output of logical AND circuit 239 is connected to the input of inverter 241 which has its output connected to the A.C. set and reset input terminals of trigger 242. The set output of trigger 242 is connected to an input of logical AND circuit 244 and to its A.C. reset terminal to condition the same. The A.C. set input terminal of trigger 242 is connected to its reset output to be thus conditioned. Logical AND circuit 244 has its output connected to an input of logical AND circuit 159. Logical AND circuits 244 thus functions to determine when counter 225 has counted to fourteen and then conditions logical AND circuit 159. Of course the inputs to logical AND circuit 244 could come from the outputs of triggers 230, 234, 238 and 242 in any combination desired to provide the appropriate skipping or inhibiting function as appropriate to the font height range under consideration.

By the arrangement just described, bit configuration skip counter 225 is advanced at the fall of the Reset 1 pulse. When the bit configuration skip counter 225 reaches a count of fourteen, logical AND circuit 244 has an output signal and it conditions logical AND circuit 159. The bit configuration skip counter 225 is also reset at condition three time because the condition two latch 158 is reset and consequently logical OR circuit 214 will not have an output and thus there is an output from inverter 226 to reset triggers 230, 234, 238 and 242.

Twice centerline counter

The twice centerline counter 250 is a six position binary counter. It consists of triggers 254, 256, 258, 260, 262 and 264. The twice centerline counter 250 either counts by one's or by two's.

In order to count by one's, the set and reset A.C. input terminals of trigger 254 are connected to the output of inverter 251. The input of inverter 251 is connected to the output of logical AND circuit 205 of counter control 200. In order for counter 250 to count by two's the A.C. set and reset terminal of trigger 256 are connected to the output of an inverter 255 which has its input connected to the output of a logical OR circuit 253. Logical OR circuit 253 has an input connected to the output of logical AND circuit 252 and an input connected to the output of logical AND circuit 211 of the counter control 200. Logical AND circuit 252 has one input connected to the set output of trigger 254 and an input connected to the output of logical AND circuit 205 of counter control 200.

When counting by one's it is seen that the twice centerline counter 250 will be advanced at the fall of the Reset 2 pulse. Similarly, when counting by two's the counter 250 will be advanced at the fall of the Reset 2 pulse; however, this time, the pulse will be applied via logical AND circuit 211. The logical OR circuit 253 is necessary in order to permit the counter to count both by one's and two's.

Twice centerline consolidation logic

The twice centerline consolidation logic 300, FIG. 2*d*, has inputs from the twice centerline counter 250. In this particular example, it is assumed that the font height range is such that the twice centerline count is not greater than forty-one and not less than twenty-nine. Further, it is therefore assumed, that the centerline count will be between 15 and 20. The twice centerline consolidation logic 300 functions to develop the centerline measurement count from the twice centerline counter 250. The basic principles underlying the twice centerline consolidation logic 300 are that if the twice centerline count is an odd number, it is entered into two centerline counters 400 whereas if it is an even number, it is entered into a single centerline counter of centerline counters 400.

Logical AND circuit 302 has inputs connected to the set outputs of triggers 260 and 264 and to the reset outputs of triggers 258 and 262 of the twice centerline counter 250. Logical AND circuit 302 does not have inputs from triggers 254 and 256. The output from logical AND circuit 302 could therefore represent either a count of forty, forty-one, forty-two or forty-three. The output of logical AND circuit 302 is connected to an input of logical AND circuit 304 which also has an input connected to the reset output of trigger 256. Consequently, the output of logical AND circuit 304 can represent only forty or forty-one. The output of logical AND circuit 304 is connected to an input of logical OR circuit 306. The output of logical OR circuit 306 represents a centerline count of 20 and it is connected to inputs of logical AND circuits 351 and 354 and to the input of inverter 352 of centerline counter control 350, FIG. 2*c*.

Logical AND circuit 308 functions to provide an indication that the counter 250 is either at a count of thirty-six, thirty-seven, thirty-eight or thirty-nine. It has inputs connected to the set outputs of triggers 258 and 264 and inputs connected to the reset outputs of triggers 260 and 262. The ouput of logical AND circuit 308 is connected to inputs of logical AND circuits 310, 312, 316 and 318. Logical AND circuit 310 also has inputs connected to the set outputs of latches 254 and 256. Hence, the output of logical AND circuit 310 is indicative of a count of thirty-nine in twice centerline counter 250. The output of logical AND circuit 310 is connected to an input of logical OR circuit 306. Hence, the count of forty-one, forty or thirty-nine will cause an entry to be made in the centerline counter corresponding to a centerline count of 20.

Logical AND circuit 312 also has an input connected to the set output of trigger 256 and consequently functions to indicate that either a count of thirty-eight or thirty-nine is in counter 250. The output of logical AND circuit 312 is conected to an input of logical OR circuit 314 which has its output connected to inputs of logical AND circuits 355 and 358 and to the input of inverter 356 of the centerline counter control 350. When logical AND circuit 312 has an output, an entry will be made into the centerline counter corresponding to a centerline count of nineteen. It is thus seen, that the count of thirty-nine causes an entry to be made in the centerline counter corresponding to a centerline count of twenty via logical OR circuit 306 and to the centerline counter corresponding to the count of nineteen via logical OR circuit 314 because both logical AND circuits 310 and 312 will have an output when there is a twice centerline count of thirty-nine in the counter 250.

Logical AND circuit 316 functions to determine when a count of thirty-seven is contained in the twice centerline counter 250 and has inputs connected to the set and reset outputs of triggers 254 and 256, respectively, and its output is connected to an input of logical OR circuit 314. Logical AND circuit 318 functions to determine when either a count of thirty-six or thirty-seven is contained in counter 250. It additionaly has an input connected to the reset output of trigger 256 and its output is connected to an input of logical OR circuit 320. The output of logical OR circuit 320 is connected to inputs of logical AND circuits 359 and 362 and to the input of inverter 360 of the centerline counter control 350 and functions to permit an entry into the centerline counter for a centerline count of eighteen. Logical OR circuit 320 also has an input connected to the output of logical AND circuit 324 which is conditioned by logical AND circuit 322. Logical AND circuit 322 has inputs connected to the set output of trigger 264 and to the reset outputs of triggers 258, 260, and 262. Hence, the output of logical AND circiut 322 is indicative of the count of thirty-two, thirty-three, thirty-four or thirty-five in counter 250. However, since logical AND circuit 324 also has inputs connected to the set outputs of triggers 254 and 256 its output can only represent the count of thirty-five.

The output of logical AND circuit 322 is also connected to condition logical AND circuits 326, 330 and 332. Logical AND circuit 326 also has an input connected to the set output of trigger 256 and hence its output is representative of a count of thirty-four or thirty-five. The output of logical AND circuit 326 is connected to the input of logical OR circuit 328 which has its output connected to inputs of logical AND circuits 363 and 366 and to the input of inverter 364. Logical AND circuit 330 also has an input connected to the set output of trigger 254 and to the reset output of trigger 256 and consequently its output can indicate only a count of thirty-three. The output of logical AND circuit 330 is connected to an input of logical OR circuit 328. The output of logical OR circuit 328 permits an entry into the centerline counter 400 corresponding to a centerline count of seventeen. The logical AND circuit 332 has an input connected to the reset output of trigger 256 and hence its output is indicative of the count thirty-three or thirty-two. The output of logical AND circuit 332 is connected to an input of logical OR circuit 334 which has its output connected to inputs of logical AND circuits 367 and 370 and to the input of inverter 368 of counter control 350.

Logical OR circuit 334 also has an input connected to the output of logical AND circuit 338 which is conditioned by logical AND circuit 336. Logical AND circuit 336 has inputs connected to the set outputs of triggers 258, 260, 262 and to the reset output of trigger 264. Hence, the output of logical AND circuit 336 can represent a count of twenty eight, twenty nine, thirty or thirty one. Logical AND circuit 338 also has inputs connected to the set outputs of triggers 254 and 256. Since logical AND circuits 332 and 338 are connected to inputs of logical OR circuit 334 an entry of the count of sixteen can be made into the centerline counter 400 corresponding to a centerline count of sixteen.

Logical AND circuit 340 has an output when counter 250 has a value of either twenty-nine, thirty, or thirty-one. Logical AND circuit 340 has inputs connected to the output of logical AND circuit 336 and to the set output of trigger 254. Logical AND circuit 344 has an output when twice centerline counter 250 only contains a count of thirty. Logical AND circuit 344 has inputs connected to the output of logical AND circuit 336 and to the set output of trigger 256. The outputs of logical AND circuits 340 and 344 are connected to inputs of logical OR circuit 342 which has its output connected to inputs of logical AND circuits 371 and 374 and to the input of inverter 372 of the centerline counter control 350. The output of logical OR circuit 342 permits an entry into the centerline counter 400 corresponding to a centerline count of fifteen.

From the foregoing it is seen that the twice centerline consolidation logic 300 functions to reduce the twice centerline count to a single centerline count. Further, it is seen that if the twice centerline count is odd, then two single centerline counts are developed whereas if the twice centerline count is even, only a single centerline count is developed. Further, it is seen that the twice centerline consolidation logic 300 provides outputs to the centerline counter control 350 which, as it will be seen shortly, controls the entry of pulses into the centerline counters 400.

Centerline counter control

The centerline counter control 350 controls the operation of centerline counters 400 to permit a dynamic determination as to which centerline counter is at a maximum at any time. The centerline counter control 350 either enables a count of one to be added into or subtracted from the centrline counters 400. The centerline counter of centerline counters 400 which is at the zero condition represents the centerline counter having the maximum count.

Initially, all centerline counters 400 are reset. Logical AND circuits 351, 355, 359, 363, 367 and 371 each have an input connected to a terminal indicating the zero conition of the associated centerline counter. The outputs of logical AND circuits 351, 355, 359, 363, 367 and 371 are connected to inputs of logical OR circuit 375 which has its output connected to an input of an inverter 376 and to inputs of logical AND circuits 353, 357, 361, 365, 369 and 373. Logical AND circuits 353, 357, 361, 365, 369 and 373 also have inputs connected to outputs of inverters 352, 356, 360, 364, 368 and 372, respectively.

The outputs of logical AND circuits 353, 357, 361, 365, 369 and 373 are connected to the input terminals 408, 416, 424, 432, 440 and 448 of counters 402, 410, 418, 426, 434 and 442, respectively. These input terminals controls the adding of one into the associated counters.

The output of inverter 376 is connected to inputs of logical AND circuits 354, 358, 362, 366, 370 and 374, for controlling the subtraction of one from the value in the counters 402, 410, 418, 426, 434 and 442. Their outputs are connected to terminals 406, 414, 422, 430, 438 and 446 of these respective counters.

By the above described logic, a one is entered into all counters not in the zero condition if the event or events to be counted have their corresponding counters in the zero condition. In other words, if the counter for recording a centerline count of 15 is in the zero condition and logical OR circuit 342 has an output, then a one will be entered into counters 402, 410, 418, 426 and 434, but not in counter 442. Further, if counters 434 and 442 were in the zero condition, and logic OR circuit 334 and 342 had outputs simultaneously, a one would be entered into counters 402, 410, 418 and 426, but not into counters 434 and 442. Further, if logical OR circuit 342 has an output and the associated centerline counter 442 is not in the zero condition, then a one is subtracted from the centerline counter 442 and nothing is added into or subtracted from counters 402, 410, 418, 426 or 434.

Centerline counters

The centerline counters 400 include counters 442, 434, 426, 418, 410 and 402 which correspond to centerline counts fifteen, sixteen, seventeen, eighteen, nineteen and twenty, respectively. Structurally the centerline counters 400 are substantially identical, therefore only one of the centerline counters 400 will be described.

The details of the typical centerline counter 402 are shown in FIG. 5. In this particular example, each centerline conuter consists of seven binary triggers 443, 444, 445, 446, 447, 448 and 449. This enables one hundred and twenty seven scans ot be counted. The DC resets of these triggers forming the counter positions are connected to terminal 405 which is connected to a reset line leading to the output of singleshot multivibrator 480 of scan control 475 to permit initial resetting of all positions of the counter 402. Position one is a typical position of the counter and it has its AC set and reset terminals connected to the output of a logical AND circuit 450. Logical AND circuit 450 has an input connected to the timing ring 29 for receiving a T36 pulse, an input connected to the output of a logical OR circuit 451 and input connected to the output of an inverter 453. Logical OR circuit 451 has inputs connected to terminals 406 and 408 which are connected to the outputs of logical AND circuits 354 and 353 respectively for controlling the counter 402 in a subtractive and additive manner, respectively. Inverter 453 has its input connected to the output of a logical AND circuit 452. Logical AND circuit 452 has inputs connected to the set outputs of triggers 443, 444, 445, 446, 447, 448 and 449. Hence, if none of the triggers forming the counter 402 are set, logical AND circuit 450 will pass a signal at T36 time if there is an output from either logical AND circuit 353 or 354. Logical AND circuit 353 also has its output connected to inputs of logical AND circuits 454, 455, 456, 457, 458 and 459 for controlling the adding of one into counter 402. These logical AND circuits also have inputs connected to the reset outputs of triggers 443, 444, 445, 446, 447 and 448 and their outputs are connected to inputs of logical OR circuits 466, 467, 468, 469, 470 and 471, respectively. These logical OR circuits also have inputs connected to the outputs of logical AND circuits 460, 461, 462, 463, 464 and 465 which each have an input connected to the output of logical AND circuit 354 and inputs from the set output of triggers 443, 444, 445, 446, 447 and 448, respectively. The outputs of these logical OR circuits are connected to the AC binary set and reset inputs of triggers 444, 445, 446, 447, 448 and 449, respectively. Each of the triggers 443, 444, 445, 446, 447, 448 and 449 have their AC set and reset inputs conditioned by outputs of logical AND circuits 472 and 473 which have inputs connected to the output of logical AND circuit 216 of counter control 200 and inputs connected to the set and reset outputs of the associated trigger, respectively.

The reset outputs of triggers 443, 444, 445, 446, 447, 448 and 449 are connected to inputs of a logical AND circuit 474 which also has an input connected to the output of an inverter 401. Inverter 401 has an input connected to the output of logical AND circuit 216 of counter control 200. Consequently, logical AND circuit 474 will have an output when all positions of the counter 402 are in the reset state and the counter 402 is not enabled. The output of logical AND circuit 474 is connected to the set terminal of a latch 409. The reset terminal of latch 409 is connected to timing ring 29 for receiving a T39 pulse. The set and reset outputs of latch 409 indicate whether the counter 402 is or is not in the zero state, respectively. The latch 409 will again be set after the pulse T39 goes away if the conditions of logical AND circuit 474 are still satisfied.

Number of scans control

Figure 2G:
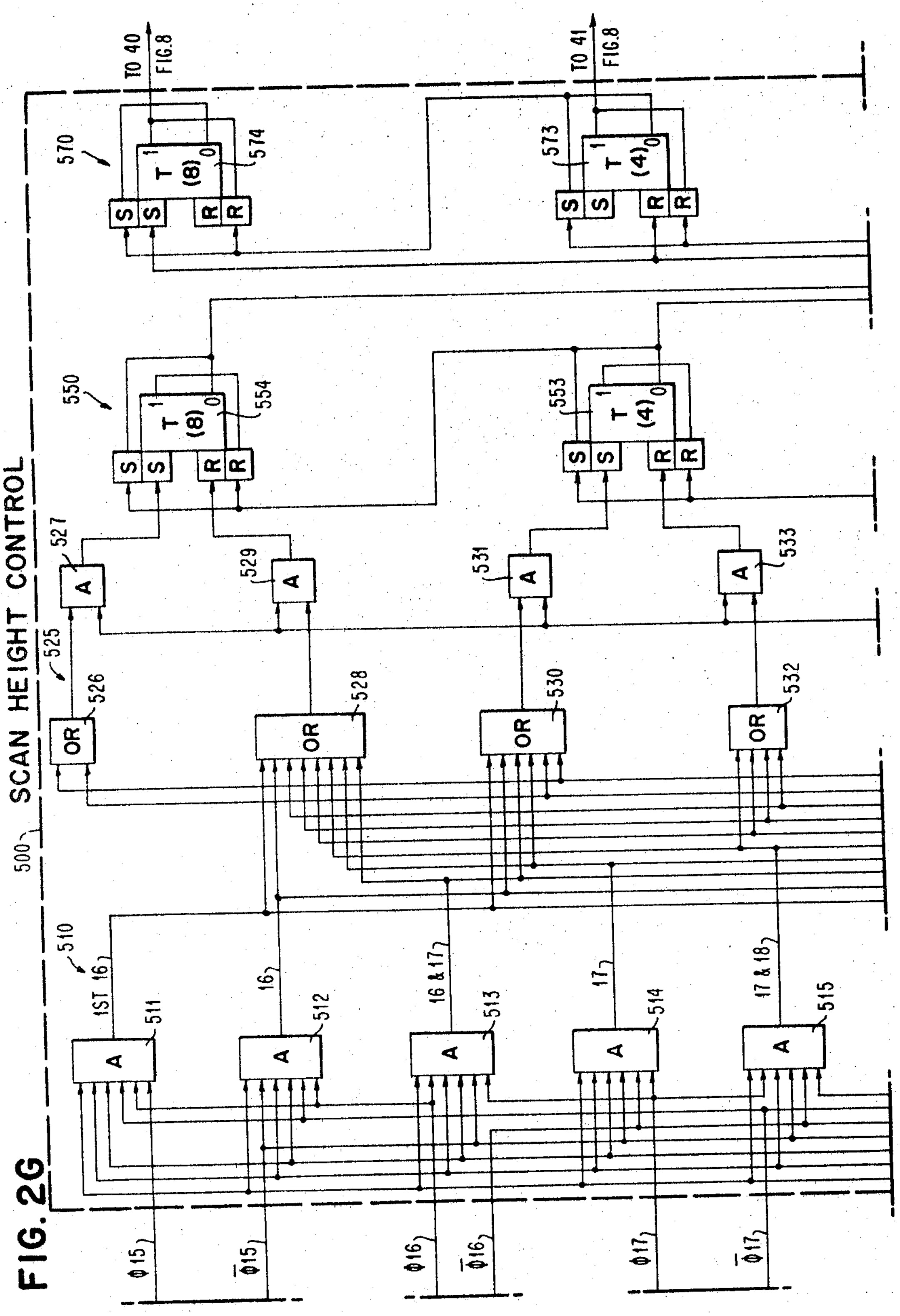
Figure 2H:
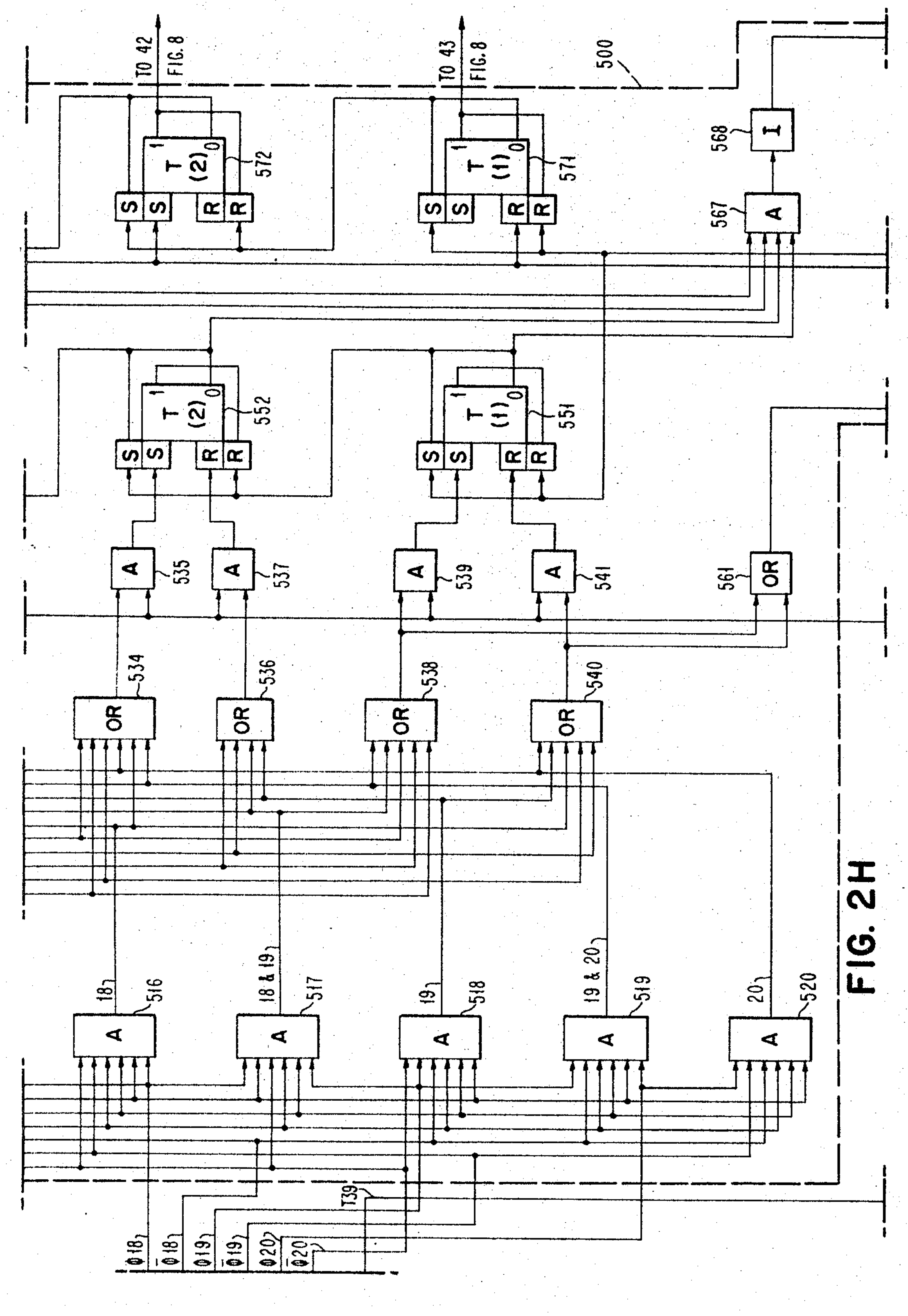
Figures 2I, 3:
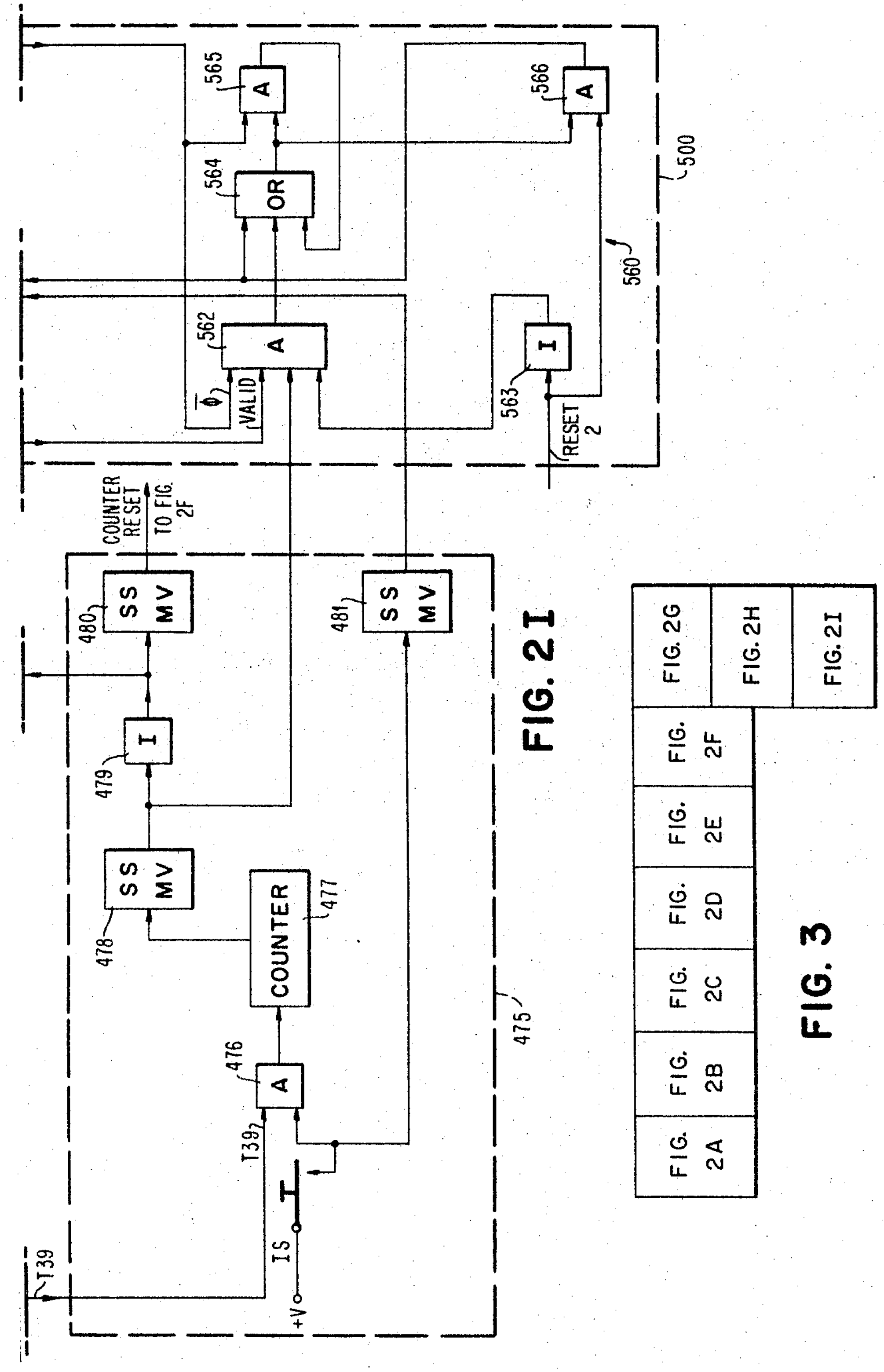
FIG. 3 shows the arrangement of FIGS. 2*a*, 2*b*, 2*c*, 2*d*, 2*e*, 2*f*, 2*g*, 2*h* and 2*i*.

The number of scans control 475, FIG. 2*i*, initializes the scan height for measuring the characters by providing a pulse to scan height control 500, FIGS. 2*g*, 2*h* and 2*i*. This pulse as it will be seen later herein, sets the beam control counter 570 of scan height control 500 to an initial value. The outputs from this counter 570 provide signals to the beam deflection circuitry 20 to control the height of the scan. The initialized scan height signal could be developed in many ways such as after engaging the first character in a line or field on a document. However, for purposes of simplicity, the signal is shown as being developed upon the closing of a switch IS. The output of the switch IS is connected to the input of a singleshot multivibrator 481 and of a logical AND circuit 476. The output of singleshot multivibrator 481 is connected to inputs of the beam control counter 570 of scan height control 500 to initially set this four position binary counter to a value of ten. The singleshot multivibrator 481 permits initial setting of counter 570 without holding it in the initial set condition. Thus counter 570 can be advanced thereafter to a new value while switch IS remains closed.

The output of the switch IS conditions logical AND circuit 476. Logical AND circuit 476 also has an input connected to timing ring 29 for receiving a T39 pulse. The output of the logical AND circuit 476 is connected to advance counter 477. Hence, the counter 477 will be advanced once for each scan. After a predetermined number of scans, as determined by which stage of the counter 477 the output is taken from, a signal is passed to a singleshot multivibrator 478 to effect a readout from an intermediate control counter 550 within scan height control 500 to the beam control counter 570 thereof. After this readout occurs, the fall of the signal from the singleshot multivibrator 478 is inverted by inverter 479 and fires singleshot multivibrator 480. The output from the singleshot multivibrator 480 is used to reset the centerline counters 400.

Scan height control

Scan height control 500 essentially consists of counters 550 and 570 and logic circuitry 510 for developing exclusive maximum outputs from counters 400, logic circuitry 525 for controlling the entry of the exclusive maximum outputs into intermediate control counter 550 and logic circuitry 560 for permitting the intermediate control counter 550 to be driven to zero and for pulsing the beam control counter 570 a number of pulses equivalent to the number of pulses for advancing the intermediate control counter 550 to zero.

The scan height control 500 perhaps can be best understood with reference to FIG. 7. In FIG. 7, it is seen that exclusive maximum outputs are developed from the centerline measurement. These exclusive maximum outputs are indicative of a measured font height and have a corresponding number in the intermediate control counter 550. For example, an exclusive maximum output of 15 and 16 which is developed by logical AND circuit 511, FIG. 2, is equivalent to a measured font height of 77.5 mils, FIG. 7, and by means of OR circuits 528, 530, 534, and 538, it causes intermediate control counter to be set to a value of 7.

At readout time a pulse from counter 477 fires singleshot multivibrator 478 thus preventing any entry into intermediate control counter through the DC set and reset inputs. The pulse from the singleshot multivibrator 478 is also applied to logical AND circuit 562 which has another input for indicating that the counter 550 is not a zero. This is determined by logical AND circuit 567 and inverter 568. Logical AND circuit 562 also has an input connected to the output of an inverter 563 which is connected to timing circuit 25 for receiving a Reset 2 pulse. This latter input prevents a partial input signal to be passed.

Logical AND circuit 562 also has an input connected to the output of a logical OR circuit 561 which has inputs connected to the outputs of logical OR circuits 538 and 540. This latter input effectively indicates that a valid input condition exists into the intermediate control counter 550. The output of a logical AND circuit 562 is connected to an input of a logical OR circuit 564 also having inputs connected to outputs of logical AND circuits 565 and 566. Logical AND circuit 565 effectively forms a latch with logical OR circuit 564 and will have an output as long as the intermediate control counter 550 is other than zero. Thus, after the signal from the singleshot multivibrator 478 goes away, there will still be an output from logical OR circuit 564 to logical AND circuits 565 and 566.

Logical AND circuit 566 has an input connected to timing circuit 25 for receiving the Reset 2 pulse and an input connected to the output of logical OR circuit 564. The output of logical AND circuit 566 is connected to the AC set and reset inputs of triggers 551 and 571 of counters 550 and 570, respectively. Hence, counters 551 and 570 will be advanced at Reset 2 time and when counter 550 goes to zero, logical AND circuit 565 will no longer have an output and therefore, there will no longer be an output from logical OR circuit 564 and thus logical AND circuit 566 will no longer be conditioned to pass Reset 2 pulses. The outputs from the triggers 571, 572, 573, and 574 forming the beam control counter 570 are connected to inputs of the beam deflection circuitry 20.

Beam deflection circuitry

Beam deflection circuitry 20 is substantially conventional circuitry and includes a small sweep circuit 35, FIG. 8, which generates a high speed vertical sawtooth voltage waveform for the purpose of scanning a character. The output signal is taken from emitter follower 36. Capacitor C is primarily charged through the grounded base transistor 37 and it is held at a potential of approximately −5.4 volts when a reset pulse is applied to transistor 38. The reset pulse is applied to effect a retrace to facilitate the next vertical character scan by the cathode ray beam. The grounded base transistor 37 charges the capacitor C to a level for causing vertical deflection of approximately 118 mils. The charge of the capacitor C can be modified in sixteen incremental steps by means of signals from counter 570 which are applied to terminals 40, 41, 42 and 43, respectively. When a signal applied to any of the inputs 40, 41, 42 or 43 is at a positive potential, such as ground potential, the associated transistors 45 are cut off thereby allowing current to flow through transistors 47 and add to the main current source of transistor 37. In this particular example, when counter 570 is reset to ten by closing switch IS, FIG. 2, positive potential signals are applied to terminals 40 and 42, FIG. 8 and the scan height is approximately 160 mils, see FIG. 7. Changes in values in the beam control counter correspondingly cause changes in the scan height as shown.

While the invention has been particularly shown and described with reference to a preferred embodiment thereof, it will be understood by those skilled in the art that the foregoing and other changes in form and details may be made therein without departing from the spirit and scope of the invention.

What is claimed is:

1. Measuring apparatus comprising:
scanning means for electronically scanning across an item to be measured and generating a scan signal for each scan;
dividing means connected to said scanning means for dividing said scan signal into a series of binary pulses; where each binary pulse represents an incremental distance traversed by said scanner relative to said item to be measured;
logic means connected to said scanning means and to said dividing means for developing start and stop counting control signals upon detecting predetermined sequences of binary pulses in said scan; and
counting means for counting pulses received under control of said logic means whereby said counter starts and stops counting said binary pulses upon said logic means developing said start and stop counting signals, respectively, and the number of binary pulses counted represents the length of said item.

2. The measuring apparatus of claim 1 further comprising:
control means connected to said counting means to pre-set the same to an initial value and responsive to said scanning means to prevent entry of additional pulses in said counting means after a predetermined number of scans.

3. Character height measuring apparatus comprising:
scanning means for scanning a character in a series of scans and providing quantized output signals for each scan;
storing means connected to said scanning means for receiving and temporarily storing said quantized signals in the sequence of occurrence;

logic means connected to said storing means for developing start and stop counting control signals upon detecting predetermined sequences of quantized signals in said storing means;

counting means operably connected to said logic means and connected to said scanning means to counting the quantized output signals in response to receiving said start and stop counting signals from said logic means;

a plurality of indicating means, one for each possible scan height; and means connected between said counting means and said plurality of indicating means for activating one of said plurality of indicating means according to the value in said counting means.

4. Character height measuring and normalizing apparatus comprising scanning means for scanning a character in a series of scans to provide output signals;

timing means for furnishing first and second series of time related pulses;

quantizing means connected to said scanning means and to said timing means for dividing the signal of each scan with said first series of time related pulses into a series of binary signals;

storing means connected to said quantizing means and to said timing means for temporarily storing said binary signals in the sequence of occurrence under control of said second series of time related pulses;

logic means connected to said timing means to be rendered operable thereby at predetermined times and connected to said storing means to provide first, second and third control signals upon said binary signals having predetermined sequences;

a first counter connected to said timing means to receive said second series of time related pulses and connected to said logic means to be controlled by said first control signal to count by one's and by said second control signal to count by two's for each said second series of time related pulses where the value in said first counter represents twice the centerline height of the character scanned;

a series of second counters connected to said logic means to be rendered operable in a counting mode by said third control signal, said second counters each representing a discrete centerline height; and counter logic means connected between said first counter and said series of second counters to control the entry of pulses therein according to the value in said first counter at the time said series of second counters are rendered operable by said third control signal.

5. The character height measuring and normalizing apparatus of claim 4 further comprising:

means for resetting said first counter after each scan to permit a series of entries into said second series of second counters and means for determining which second counter of said series of second counters is at a maximum.

6. The character height measuring and normalizing apparatus of claim 5 wherein said means for determining which second counter is at a maximum is operative to make said determination at the end of each scan.

7. The character height measuring and normalizing apparatus of claim 5 further comprising:

means operative after a predetermined number of scans for rendering operative said means for determining which second counter is at a maximum.

8. Character height measuring and normalizing apparatus of claim 7 further comprising:

scan height control means connected to each of said series of second counters and operable to provide a plurality of control signals according to the different states of said second series of counters.

9. The character height measuring and normalizing apparatus of claim 8 further comprising;

means for presetting said scan height control means to an initial condition.

10. The character height measuring and normalizing apparatus of claim 9 wherein said scan height control means is rendered operable to provide a plurality of control signals according to the states of said series of second counters after a predetermined number of scans.

11. Character height measuring and statistical mode determining apparatus comprising:

means for determining the centerline height of at least some characters at different positions within the characters, said centerline height being represented by one measurement made from the bottom of the lower line of a character to the bottom of the upper line forming the character and another measurement made from the top of the lower line to the top of the upper line forming the character, these two measurements being added together and the sum divided by two to result in the centerline height;

counting means for indicating the centerline height of the characters at each of said determining positions within the characters; and means responsive to said counting means for determining the statistical mode of the centerline heights to provide an overall centerline height for each character.

12. Character height measuring and statistical mode determining apparatus comprising:

means for measuring the twice centerline height of characters at a series of predetermined positions within a character, said twice centerline height of characters being represented by one measurement made from the bottom of the lower line of the character to the bottom of the upper line forming the character and another measurement made from the top of the lower line to the top of the upper line forming the character, these two measurements being added together to result in twice the centerline height;

means for reducing the twice centerline heights to centerline height values; and means responsive to said centerline height values for determining the statistical mode of the centerline height values to provide an overall centerline height of each character.

13. Character height measuring apparatus comprising:

first means for detecting the bottom of the lower line of a character;

second means for detecting the top of the lower line of a character;

third means for detecting the bottom of the upper line forming a character;

fourth means for detecting the top of the upper line forming a character; and means operative in response to said first, second, third and fourth detecting means for providing the centerline height of a character by making one measurement from the bottom of the lower line as detected by said first means to the bottom of the upper line as detected by said third means and by making a second measurement from the top of the lower line as detected by said second means to the top of the upper line as detected by said fourth means, these two measurements being added together and the sum divided by two to result in the centerline height.

14. Character height measuring and statistical mode determining apparatus comprising:

means for providing a first series of values at predetermined positions within characters corresponding to half the distance between the upper and lower boundaries of the lower line of a character;

means for providing a second series of values at predetermined positions within characters corresponding to one-half the distance between the lower and upper boundaries of the top line of a character;

means for providing a third series of values at predetermined positions within characters corresponding to the distance between the upper boundary of the lower line and the lower boundary of the upper line of a character; and means for combining said first, second and third series of values to provide a statistical mode centerline height of the characters.

15. In a character recognition system having a scanner for scanning characters, means for determining the centerline height of characters said centerline height being represented by one measurement made from the bottom of the lower line of a character to the bottom of the upper line forming the character and another measurement made from the top of the lower line to the top of the upper line forming the character, these two measurements being added together and the sum divided by two to result in the centerline height; and means connected to said determining means and responsive to the centerline height of characters for adjusting the scan height of said scanner according to the determined centerline character height.

16. In a character recognition system having a scanner for scanning characters with a raster scan, the improvement comprising:

means responsive to said scanner for measuring the centerline height of said characters, said centerline height being represented by one measurement made from the bottom of the lower line of a character to the bottom of the upper line forming the character and another measurement made from the top of the lower line to the top of the upper line forming the character, these two measurements being added together and the sum divided by two to result in the centerline height; and means responsive to the centerline height measurement for adjusting the height of said raster scan according to said measured centerline height.

17. The character recognition system of claim 16 wherein said adjusting means adjusts the height of said raster scan by changing the velocity thereof.

18. In a character recognition system:

means for making centerline height measurements at different positions within a character, said centerline height being represented by one measurement made from the bottom of the lower line of a character to the bottom of the upper line forming the character and another measurement made from the top of the lower line to the top of the upper line forming the character, these two measurements being added together and the sum divided by two to result in the centerline height; and means responsive to said centerline height measurements for determining the statistical mode of said measurements to provide an overall centerline height for each character.

References Cited

UNITED STATES PATENTS

| | | | |
|---|---|---|---|
| 3,295,105 | 12/1966 | Gray | 340—146.3 |
| 3,346,845 | 10/1967 | Fomenko | 340—146.3 |

MAYNARD R. WILBUR, Primary Examiner

R. F. GNUSE, Assistant Examiner

PO-1050
(5/69)

UNITED STATES PATENT OFFICE
CERTIFICATE OF CORRECTION

Patent No. 3,462,737 Dated August 19, 1969

Inventor(s) D. L. MALABY

It is certified that error appears in the above-identified patent and that said Letters Patent are hereby corrected as shown below:

Claim 3, column 19, line 13, after "to", second occurrence, insert --start and stop--

SIGNED AND
SEALED

DEC 9 - 1969

(SEAL)
Attest:

Edward M. Fletcher, Jr.
Attesting Officer

WILLIAM E. SCHUYLER, JR.
Commissioner of Patents